US012650889B2

(12) United States Patent (10) Patent No.: US 12,650,889 B2
Li et al. (45) Date of Patent: Jun. 9, 2026

(54) METHOD FOR ASSESSING RISK CAUSED BY IMPROPER USE OF CLUSTER DATA RESOURCE, ELECTRONIC DEVICE AND STORAGE MEDIUM

(71) Applicant: Beijing Volcano Engine Technology Co., Ltd., Beijing (CN)

(72) Inventors: Wenjie Li, Beijing (CN); Yaohua Li, Beijing (CN); Wenchi Zhang, Beijing (CN); Chao Cui, Beijing (CN); Hongbin Liu, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/939,189

(22) Filed: Nov. 6, 2024

(65) Prior Publication Data

US 2025/0147828 A1 May 8, 2025

(30) Foreign Application Priority Data

Nov. 7, 2023 (CN) .......................... 202311475501.0

(51) Int. Cl.
*G06F 11/00* (2006.01)
(52) U.S. Cl.
CPC .................................. *G06F 11/008* (2013.01)
(58) Field of Classification Search
CPC ............. G06F 11/1464; G06F 11/1451; G06F 11/328; G06F 11/1446
See application file for complete search history.

(56) References Cited

U.S. PATENT DOCUMENTS 8,745,633 B2 * 6/2014 Jayaraman ............ G06F 9/5061
718/1
2013/0097709 A1 4/2013 Basavapatna et al.
(Continued)

FOREIGN PATENT DOCUMENTS

CN       112486790 A       3/2021
CN       112925650 A       6/2021
(Continued)

OTHER PUBLICATIONS

China National Intellectual Property Administration, Notice of Allowance Issued in Application No. 202311475501.0, Dec. 10, 2025, 14 pages.

*Primary Examiner* — Amine Riad
(74) *Attorney, Agent, or Firm* — Alleman Hall LLP

(57) ABSTRACT

A method and an apparatus for assessing a risk caused by improper use of a cluster data resource, an electronic device and a storage medium are provided. A high-risk diagnosis indicator in a storage assessment dimension and a high-risk diagnosis indicator in a computation assessment dimension are obtained. The amount of high-risk diagnosis indicators in the storage assessment dimension that are satisfied in the use process of the data storage resource and the amount of high-risk diagnosis indicators in the computation assessment dimension that are satisfied in the use process of the data computation resource are counted, and are recorded as high-risk indicator trigger quantities. Risk on the data storage resource is assessed based on the high-risk indicator trigger quantity in the storage assessment dimension, and risk on the data computation resource is assessed based on the high-risk indicator trigger quantity in the computation assessment dimension.

20 Claims, 4 Drawing Sheets

(56) References Cited

U.S. PATENT DOCUMENTS

2020/0334133 A1    10/2020  Tsirkin
2023/0039827 A1*    2/2023  Wani ..................... G06F 11/328

FOREIGN PATENT DOCUMENTS

| CN | 113407950 A | 9/2021 |
|----|-------------|--------|
| CN | 115330250 A | 11/2022 |
| CN | 116127149 A | 5/2023 |
| CN | 116611910 A | 8/2023 |

* cited by examiner

S101 obtaining an assessment dimension for assessing a risk of a cluster data resource, wherein the cluster data resource comprises a data storage resource and a data computation resource, and the assessment dimension comprises a storage assessment dimension and a computation assessment dimension

S102 obtaining at least one high-risk diagnosis indicator in the storage assessment dimension and at least one high-risk diagnosis indicator in the computation assessment dimension, wherein the high-risk diagnosis indicator in the storage assessment dimension comprises an indicator for representing that a data resource usage amount of the data storage resource exceeds a first data storage resource threshold and/or an indicator for representing that the data storage resource does not comply with a first data storage resource usage rule, and the high-risk diagnosis indicator in the computation assessment dimension comprises an indicator for representing that a data resource usage amount of the data computation resource exceeds a first data computation resource threshold

S103 counting a high-risk indicator trigger quantity in the storage assessment dimension and a high-risk indicator trigger quantity in the computation assessment dimension, wherein the high-risk indicator trigger quantity in the storage assessment dimension is an amount of high-risk diagnosis indicators in the storage assessment dimension that are satisfied in a use process of the data storage resource, and the high-risk indicator trigger quantity in the computation assessment dimension is an amount of high-risk diagnosis indicators in the computation assessment dimension that are satisfied in a use process of the data computation resource

S104 assessing a risk caused by improper use of the data storage resource based on the high-risk indicator trigger quantity in the storage assessment dimension, and assessing a risk caused by improper use of the data computation resource based on the high-risk indicator trigger quantity in the computation assessment dimension

Fig. 1

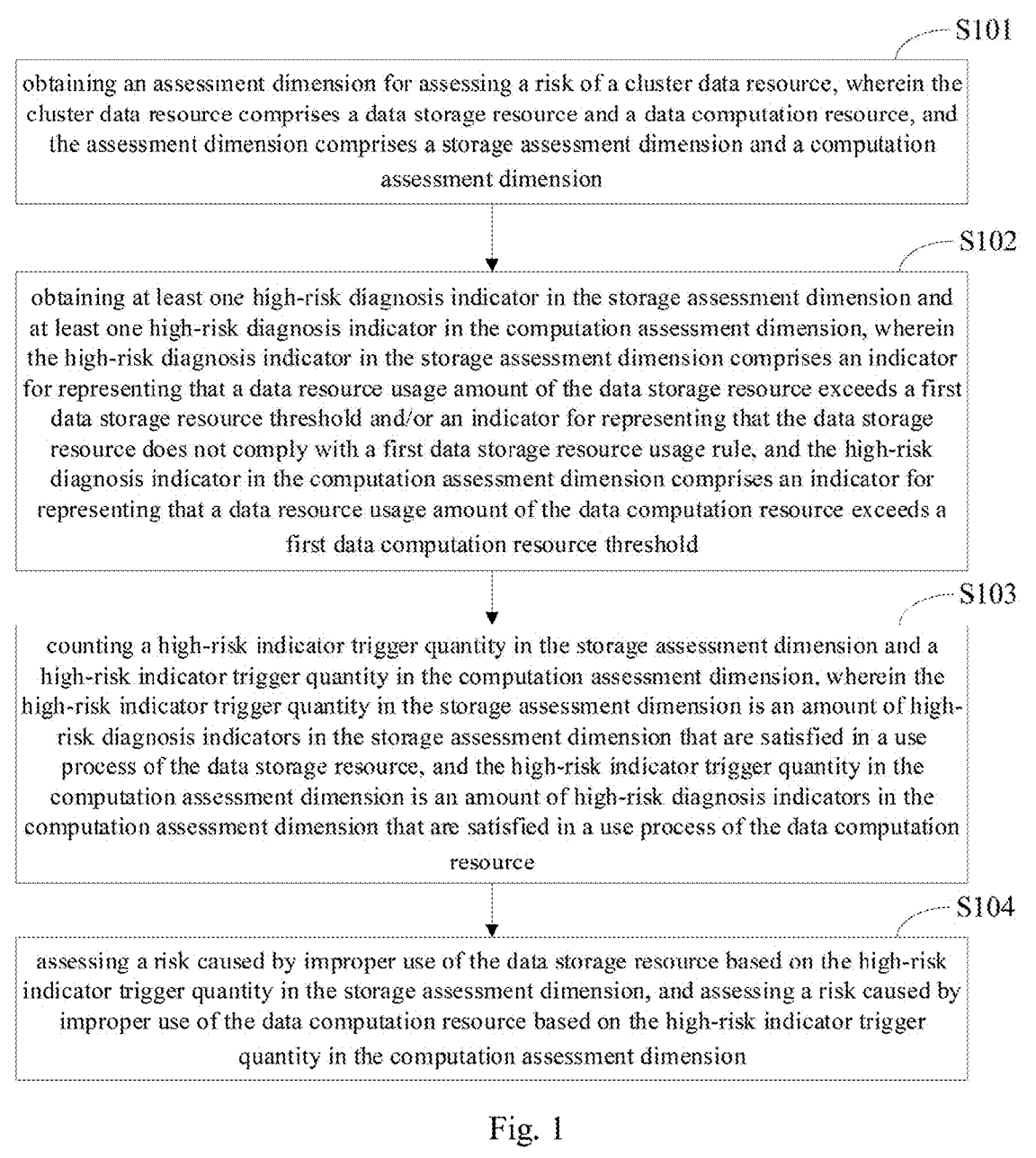

METHOD FOR ASSESSING RISK CAUSED BY IMPROPER USE OF CLUSTER DATA RESOURCE, ELECTRONIC DEVICE AND STORAGE MEDIUM

CROSS-REFERENCE TO RELATED APPLICATION

The present application claims priority of Chinese Patent Application No. 202311475501.0, filed on Nov. 7, 2023, the disclosure of which is hereby incorporated herein by reference in its entirety as part of the present disclosure.

TECHNICAL FIELD

The present disclosure relates to the field of computer technologies, and in particular, to a method and an apparatus for assessing a risk caused by improper use of a cluster data resource, an electronic device and a storage medium.

BACKGROUND

In the big data scenario, data-related services develop rapidly, and various service scenarios are implemented by means of cluster resources, for example, cluster hardware resources. Hardware may be used to establish a service and undertake a computation task, so as to meet requirements of various service scenarios. After the cluster hardware resources come into use, improper use of the cluster hardware resources may cause a use risk in the use process of the cluster hardware resources, and after the risk escalates, a serious service accident may be caused. The cluster data resource is a quantized value corresponding to the cluster hardware resource. To avoid service accidents as much as possible, the risk in the use process of the cluster data resource also needs to be estimated in advance.

SUMMARY

In view of the above, the present disclosure provides a method and an apparatus for assessing a risk caused by improper use of a cluster data resource, to assess the risk in the use process of the cluster hardware resource, so as to perceive the risk in advance.

To solve the above problems, the technical solutions provided by the present disclosure are as follows.

In an aspect, the present disclosure provides a method for assessing a risk caused by improper use of a cluster data resource, and the method comprises:

obtaining an assessment dimension for assessing the risk of the cluster data resource, wherein the cluster data resource comprises a data storage resource and a data computation resource, and the assessment dimension comprises a storage assessment dimension and a computation assessment dimension;

obtaining at least one high-risk diagnosis indicator in the storage assessment dimension and at least one high-risk diagnosis indicator in the computation assessment dimension, wherein the high-risk diagnosis indicator in the storage assessment dimension comprises an indicator for representing that a data resource usage amount of the data storage resource exceeds a first data storage resource threshold and/or an indicator for representing that the data storage resource does not comply with a first data storage resource usage rule, and the high-risk diagnosis indicator in the computation assessment dimension comprises an indicator for representing that a data resource usage amount of the data computation resource exceeds a first data computation resource threshold;

counting a high-risk indicator trigger quantity in the storage assessment dimension and a high-risk indicator trigger quantity in the computation assessment dimension, wherein the high-risk indicator trigger quantity in the storage assessment dimension is an amount of high-risk diagnosis indicators in the storage assessment dimension that are satisfied in a use process of the data storage resource, and the high-risk indicator trigger quantity in the computation assessment dimension is an amount of high-risk diagnosis indicators in the computation assessment dimension that are satisfied in a use process of the data computation resource; and assessing a risk caused by improper use of the data storage resource based on the high-risk indicator trigger quantity in the storage assessment dimension, and assessing a risk caused by improper use of the data computation resource based on the high-risk indicator trigger quantity in the computation assessment dimension.

In an aspect, the present disclosure provides an apparatus for assessing a risk caused by improper use of a cluster data resource, and the apparatus comprises:

an obtaining unit, configured to obtain an assessment dimension for assessing the risk of the cluster data resource, wherein the cluster data resource comprises a data storage resource and a data computation resource, and the assessment dimension comprises a storage assessment dimension and a computation assessment dimension;

a first determination unit, configured to determine at least one high-risk diagnosis indicator in the storage assessment dimension and at least one high-risk diagnosis indicator in the computation assessment dimension, wherein the high-risk diagnosis indicator in the storage assessment dimension comprises an indicator for representing that a data resource usage amount of the data storage resource exceeds a first data storage resource threshold and/or an indicator for representing that the data storage resource does not comply with a first data storage resource usage rule, and the high-risk diagnosis indicator in the computation assessment dimension comprises an indicator for representing that a data resource usage amount of the data computation resource exceeds a first data computation resource threshold;

a first counting unit, configured to count a high-risk indicator trigger quantity in the storage assessment dimension and a high-risk indicator trigger quantity in the computation assessment dimension, wherein the high-risk indicator trigger quantity in the storage assessment dimension is an amount of high-risk diagnosis indicators in the storage assessment dimension that are satisfied in a use process of the data storage resource, and the high-risk indicator trigger quantity in the computation assessment dimension is an amount of high-risk diagnosis indicators in the computation assessment dimension that are satisfied in a use process of the data computation resource; and a first assessment unit, configured to assess a risk caused by improper use of the data storage resource based on the high-risk indicator trigger quantity in the storage assessment dimension, and assess a risk caused by improper use of the data computation resource based on the high-risk indicator trigger quantity in the computation assessment dimension.

In an aspect, the present disclosure provides an electronic device, which comprises:

one or more processors; and a storage apparatus storing one or more programs, wherein the one or more programs, when executed by the one or more processors, cause the one or more processors to implement the method for assessing the risk caused by improper use of the cluster data resource according to any one of the foregoing embodiments.

In an aspect, the present disclosure provides a non-transitory computer-readable storage medium having a computer program stored thereon, wherein the computer program, when executed by a processor, causes the method for assessing the risk caused by improper use of the cluster data resource according to any one of the foregoing embodiments to be implemented.

BRIEF DESCRIPTION OF DRAWINGS

FIG. 1 is a flowchart of a method for assessing a risk caused by improper use of a cluster data resource according to an embodiment of the present disclosure;

DETAILED DESCRIPTION

Figure 2:
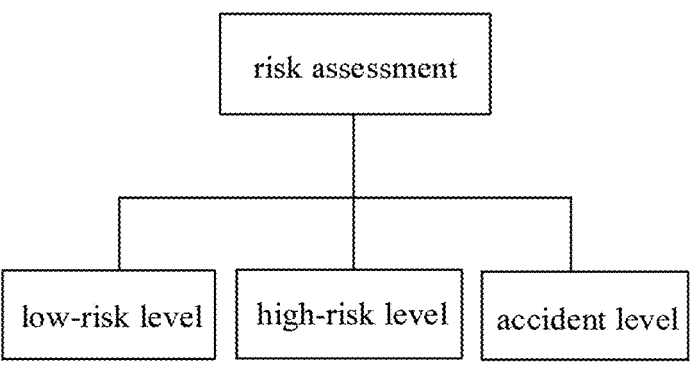
FIG. 2 is a schematic diagram of levels of risk assessment according to an embodiment of the present disclosure.

To make the objectives, technical solutions, and advantages of the present disclosure more comprehensible, the following further describes the embodiments of the present disclosure in detail with reference to the accompanying drawings and the specific implementations.

To facilitate understanding and explanation of the technical solutions provided in the embodiments of the present disclosure, the background of the present disclosure is first described.

To facilitate understanding of the present disclosure, a method for assessing a risk caused by improper use of a cluster data resource according to an embodiment of the present disclosure is described below with reference to the accompanying drawings. For example, the method for assessing the risk caused by improper use of the cluster data resource may be performed by a terminal device, a server, or the like, which is not limited by the embodiments of the present disclosure.

The present disclosure has the following beneficial effects.

The present disclosure provides a method and an apparatus for assessing a risk caused by improper use of a cluster data resource. The cluster data resource is a quantized value corresponding to the cluster hardware resource, and comprises a data storage resource and a data computation resource. An assessment dimension for assessing the risk of the cluster data resource is obtained, and the assessment dimension comprises a storage assessment dimension and a computation assessment dimension. In other words, in the storage assessment dimension, a risk caused in a use process of the data storage resource is assessed; and in the computation assessment dimension, a risk caused in a use process of the data computation resource is assessed. Then, at least one high-risk diagnosis indicator in the storage assessment dimension and at least one high-risk diagnosis indicator in the computation assessment dimension are obtained. The high-risk diagnosis indicator in the storage assessment dimension is an indicator for representing that a data resource usage amount of the data storage resource exceeds a first data storage resource threshold and/or an indicator for representing that the data storage resource does not comply with a first data storage resource usage rule, and the high-risk diagnosis indicator in the computation assessment dimension is an indicator for representing that a data resource usage amount of the data computation resource exceeds a first data computation resource threshold. If the high-risk diagnosis indicator is triggered in the use process of the cluster data resource, it indicates that one or more of the following occur: the data resource usage amount of the data storage resource exceeds the first data storage resource threshold, the data storage resource does not comply with the first data storage resource usage rule, or the data resource usage amount of the data computation resource exceeds the first data computation resource threshold. Therefore, it is determined that there is a high-risk situation in the use of the cluster data resource, which may cause an accident. On this basis, the amount of high-risk diagnosis indicators in the storage assessment dimension that are satisfied in the use process of the data storage resource is counted and is recorded as the high-risk indicator trigger quantity in the storage assessment dimension, and the amount of high-risk diagnosis indicators in the computation assessment dimension that are satisfied in the use process of the data computation resource is counted and is recorded as the high-risk indicator trigger quantity in the computation assessment dimension. The high-risk indicator trigger quantity represents a high-risk degree, and therefore risk assessment is performed on the risk caused by improper use of the data storage resource by using the high-risk indicator trigger quantity in the storage assessment dimension, and risk assessment is performed on the risk caused by improper use of the data computation resource by using the high-risk indicator trigger quantity in the computation assessment dimension, so as to complete risk assessment of the cluster data resource. A larger high-risk indicator trigger quantity indicates that there are more risk events, and the risk degree of improper use of the cluster data resource is higher.

In the present disclosure, the cluster data resources are divided into the data storage resources and the data computation resources, so that the division of the cluster data resources is more reasonable and closer to an actual situation. On this basis, the two assessment dimensions, namely, the storage assessment dimension and the computation assessment dimension, are determined, and the risks caused by improper use of the data storage resources and the data computation resources are respectively assessed from the storage assessment dimension and the computation assessment dimension, so that the risk assessment of the cluster data resources in the use process can be more accurate.

Referring to FIG. 1, FIG. 1 is a flowchart of a method for assessing a risk caused by improper use of a cluster data resource according to an embodiment of the present disclosure. As shown in FIG. 1, the method may include steps S101 to S104.

S101: obtaining an assessment dimension for assessing a risk of a cluster data resource, wherein the cluster data resource comprises a data storage resource and a data computation resource, and the assessment dimension comprises a storage assessment dimension and a computation assessment dimension.

Cluster hardware resources may include various resources for establishing a service and undertaking a computation task, such as a memory, a central processing unit (CPU), a disk, a hard disk, and the like. The processing hardware devices such as the CPU may be used to implement various computation tasks, and the storage hardware devices such as the memory, the disk, and the hard disk may be used to implement storage of data in a database, a partition, a data table, and the like. It may be learned that implementation of a computation task in a cluster depends on computation of a device such as the CPU, and output of the computation task (for example, an output data table) depends on storage of a device such as the memory and the disk.

The cluster data resource is a quantized value corresponding to the cluster hardware resource (referred to as cluster hardware for short), and is used to quantify the cluster hardware resource. The cluster data resource comprises a data storage resource and a data computation resource. The data storage resource is a data resource for storing data, and may be represented by data storage spaces (quantized value corresponding to the cluster hardware) of the cluster hardware such as the memory, the disk, and the hard disk. For example, if a disk has a data storage space of 80 GB, 80 GB may be considered as the data storage resource of the disk. The data computation resource is usable data resource for outputting data, and may be represented by quantifying time that can be used by the cluster hardware such as the CPU to output data.

In addition, the cluster hardware resource, the cluster data resource, and the like in the embodiments of the present disclosure may be determined based on a dimension of a data resource user. For example, the data resource user may be an organization, and the organization includes a person, a group, a department, and a service line. In other words, the data resource user may be an individual, a group, a department, a service line, or the like. When the data resource user is a department, the foregoing cluster hardware resource and cluster data resource are total data resources allocated to the department, and the use of the cluster data resource is also the use of internal cluster data resource in the department. Therefore, the assessment of the risk of the cluster data resource provided in this embodiment of the present disclosure may specifically be assessment of the risk of the cluster data resource of each department. The remaining data resource users are similar and are not described herein again.

The data storage resource may include data resources in dimensions such as a partition, a column, a table, a topic, a dataset, a library, and a resource group, and are represented by data storage spaces of the partition, the column, the table, the topic, the dataset, the library, and the resource group. The data computation resource may include data resources in dimensions such as a stage, an application, an instance, a task, and a queue, and are represented by time used for outputting data by the stage, the application, the instance, the task, and the queue. For details, reference can be made to the following description.

Based on the foregoing content, in the use process of the cluster data resource, the use of the cluster data resource is divided into the use of the data storage resource and the use of the data computation resource. For example, to complete a computation task, a plurality of data computation resources need to be consumed, and to store data output by the computation task, a plurality of data storage resources need to be consumed. The cluster data resource may affect the service due to improper use in the use process. For example, if all the data storage resources have been used, new data cannot be written, resulting in failure to output the new data and affecting the service. Based on this, it is necessary to determine and assess the risk caused by improper use in the use process of the cluster data resources, to intervene and process in advance based on the assessment result, so that the impact of the cluster data resources on the service due to improper use in the use process can be avoided as much as possible. Specifically, when assessing the risk in the use process of the cluster data resources, a terminal device and/or a server may obtain two assessment dimensions, namely, the storage assessment dimension and the computation assessment dimension. In the storage assessment dimension, the risk in the use process of the data storage resource is determined and assessed; and in the computation assessment dimension, the risk in the use process of the data computation resource is determined and assessed.

Referring to FIG. 2, FIG. 2 is a schematic diagram of levels of risk assessment according to an embodiment of the present disclosure. As shown in FIG. 2, according to an impact degree of a risk caused by improper use of data resources on a service, risk levels in the use process of the cluster data resources are divided into three levels: a low-risk level, a high-risk level, and an accident level. The low-risk level indicates a low risk degree, which has not yet affected the service, and requires attention and governance, otherwise the low-risk level will be upgraded to the high-risk level, resulting in an unstable situation. The high-risk level indicates a high risk degree, which is very likely to affect the service, and requires control and timely intervention and processing, otherwise the high-risk level will be upgraded to the accident level, resulting in a service accident. The accident level indicates that a service accident has occurred and has affected the service. The accident level may be divided into levels such as L0, L1, L2, L3, and Notice (risks increase gradually). In the embodiments of the present disclosure, it is necessary to determine the risk caused by improper use in the use process of the cluster data resource and avoid affecting the service as much as possible. Therefore, the risks at the low-risk level and the high-risk level need to be focused on. In addition, because the risk at the high-risk level is high and may affect the service soon, the risk at the high-risk level with a high risk degree may be focused on. The high-risk may also be called as a first risk, and the low-risk may also be called as a second risk. The risk level of the first risk is higher than the risk level of the second risk.

S102: obtaining at least one high-risk diagnosis indicator in the storage assessment dimension and at least one high-risk diagnosis indicator in the computation assessment dimension, wherein the high-risk diagnosis indicator in the storage assessment dimension comprises an indicator for representing that a data resource usage amount of the data storage resource exceeds a first data storage resource threshold and/or an indicator for representing that the data storage resource does not comply with a first data storage resource usage rule, and the high-risk diagnosis indicator in the computation assessment dimension comprises an indicator for representing that a data resource usage amount of the data computation resource exceeds a first data computation resource threshold.

After obtaining the two assessment dimensions, namely, the storage assessment dimension and the computation assessment dimension, by the terminal device and/or the server, the terminal device and/or the server further obtain at least one high-risk diagnosis indicator in the storage assessment dimension and at least one high-risk diagnosis indicator in the computation assessment dimension.

It can be learned that the risk in the use process of the cluster data resource is caused by a specific event, and the event is related to the use of the cluster data resource. The high-risk diagnosis indicator is used to determine whether a high-risk event occurs. If an event related to the cluster data resource meets the high-risk diagnosis indicator, it indicates that the event is the high-risk event, which may cause a high-risk problem, and a risk level of the cluster data resource related to the high-risk event is the high-risk level.

The high-risk diagnosis indicator in the storage assessment dimension comprises an indicator for representing that a data resource usage amount of the data storage resource exceeds a first data storage resource threshold and/or an indicator for representing that the data storage resource does not comply with a first data storage resource usage rule, and the number of indicators may be at least one (one or more). The data resource usage amount of the data storage resource exceeding the first data storage resource threshold and the data storage resource not complying with the first data storage resource usage rule are all high-risk events in the storage assessment dimension. The high-risk diagnosis indicator in the computation assessment dimension is an indicator for representing that a data resource usage amount of the data computation resource exceeds a first data computation resource threshold, and the number of indicators may be at least one (one or more). The data resource usage amount of the data computation resource exceeding the first data computation resource threshold is a high-risk event in the computation assessment dimension.

It may be understood that as long as an event related to the data storage resource triggers any high-risk diagnosis indicator in the storage assessment dimension, it may be determined that the event related to the data storage resource is a high-risk event in the storage assessment dimension. As long as an event related to the data computation resource triggers any high-risk diagnosis indicator in the computation assessment dimension, it may be determined that the event related to the data computation resource is a high-risk event in the computation assessment dimension.

Figure 3:
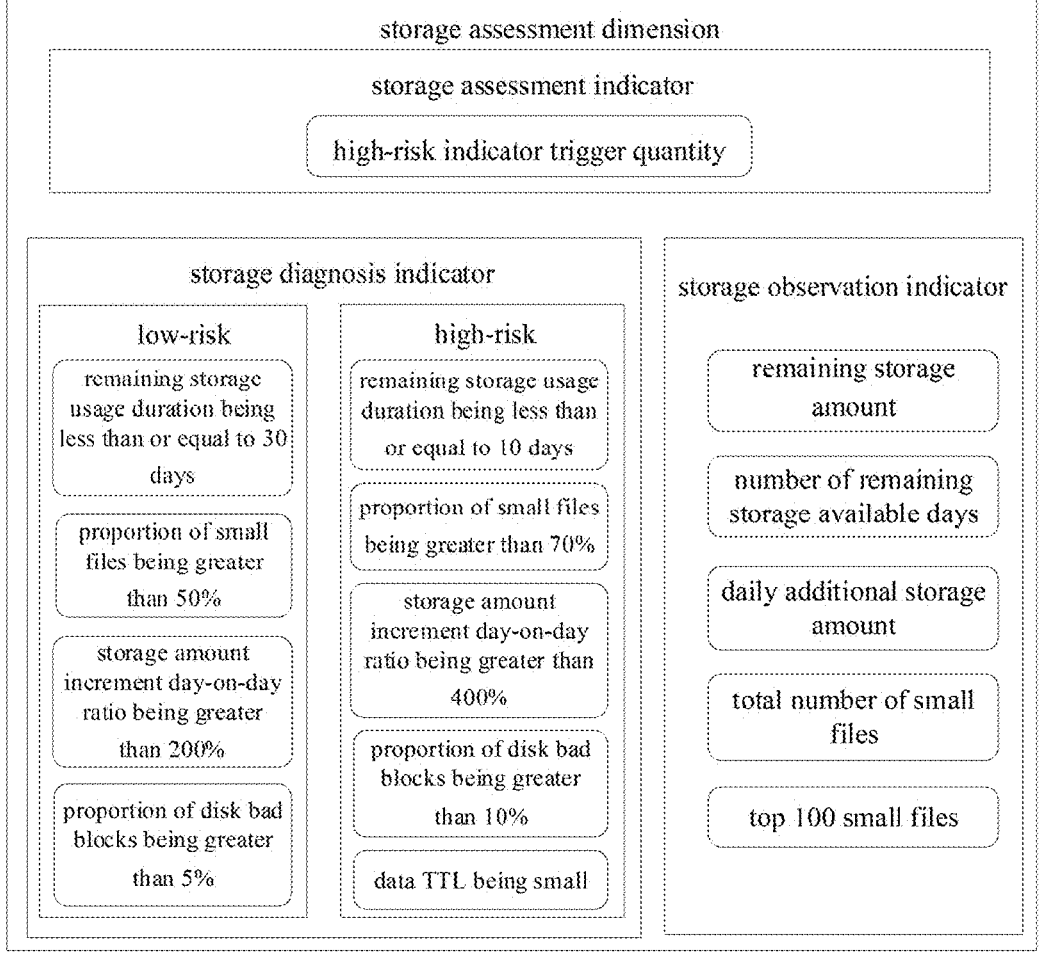
FIG. 3 is a schematic diagram of indicators for assessing a risk of a data storage resource according to an embodiment of the present disclosure.

Referring to FIG. 3, FIG. 3 is a schematic diagram of indicators for assessing a risk of a data storage resource according to an embodiment of the present disclosure.

As an optional example, in combination with FIG. 3, the high-risk diagnosis indicator in the storage assessment dimension comprises one or more of the following:

a remaining storage usage duration being less than or equal to a first number of days, a storage amount increment day-on-day ratio being greater than a first proportion, a proportion of small files being greater than a first ratio, a proportion of disk bad blocks being greater than a first bad block proportion, a write forbidding trigger duration being greater than a target duration, a storage usage rate exceeding a target usage rate, or a set lifetime being less than a recommended value.

The remaining storage usage duration, the storage amount increment day-on-day ratio, the proportion of small files, the proportion of disk bad blocks, the write forbidding trigger duration, the storage usage rate, the set lifetime, and the like are all parameters for the data resource user. For example, if the data resource user is a department, the "remaining storage usage duration" specifically refers to the remaining storage usage duration of the department. The remaining parameters are similar, and are not described herein again.

It may be understood that the remaining storage usage duration, the storage amount increment day-on-day ratio, the proportion of small files, the proportion of disk bad blocks, the write forbidding trigger duration, the storage usage rate, the set lifetime, and the like are all events related to the data storage resource in the use process, and all of them are related to the data storage resource.

The data storage resource includes a used data storage resource and a remaining data storage resource. The "remaining storage usage duration" refers to the number of days for which the remaining data storage resource is used by the data resource user. The "remaining storage usage duration being less than or equal to the first number of days" may be exemplified as "the remaining storage usage duration being less than or equal to 10 days" shown in FIG. 3. Comparison between the remaining storage usage duration and the first number of days may determine whether the remaining data storage resources of the data resource user are sufficient. When the remaining storage usage duration is less than or equal to the first number of days, the indicator "the remaining storage usage duration being less than or equal to the first number of days" is triggered, which indicates that the remaining data storage resources cannot meet the daily additional data storage amount, and it is determined that the risk degree of the data storage resource is high, and available data storage resource needs to be expanded as soon as possible, so as to avoid that new additional data cannot be written.

The specific value of the first number of days is not limited in the embodiments of the present disclosure, and may be determined according to an actual scenario. For example, the first number of days is set to 10 days, and the daily additional data storage amount of the department is 1 PB. If the current remaining data storage resource of the department is 8 PB, and the corresponding remaining storage usage duration is 8 days, the remaining storage usage duration (8 days) of the department is less than the first number of days (10 days), and it is determined that the risk degree of the data storage resource of the department is high, and available data storage resource needs to be expanded for the department as soon as possible.

In actual application, the terminal device and/or the server first obtain the remaining storage usage duration in the foregoing manner, and then the terminal device and/or the server compare the remaining storage usage duration with the first number of days, to determine whether the remaining storage usage duration is less than or equal to the first number of days. If the remaining storage usage duration is less than or equal to the first number of days, the terminal device and/or the server determine that the data storage resource satisfies the high-risk diagnosis indicator in the use process.

The "storage amount increment day-on-day ratio" is used to determine whether the use of the data storage resource suddenly increases. When the storage amount increment day-on-day ratio is greater than the first proportion, the indicator of "the storage amount increment day-on-day ratio being greater than the first proportion" is triggered, which indicates that the use of the data storage resource suddenly increases, and a situation of insufficient data storage resource may occur. At this time, it is determined that the risk degree of the data storage resource is high. The "storage amount increment day-on-day ratio being greater than the first proportion" may be exemplified as "the daily increment of data storage resource usage day-on-day ratio being greater than 400%" in FIG. 3, that is, the first proportion is 400%. The "daily increment of data storage resource usage day-on-day ratio" specifically refers to a ratio of a difference obtained by subtracting the new additional data storage amount yesterday from the new additional data storage amount today to the new additional data storage amount yesterday.

In actual application, the terminal device and/or the server first calculate the storage amount increment day-on-day ratio in the foregoing manner, and then the terminal device and/or the server compare the storage amount increment day-on-day ratio with the first proportion, to determine whether the storage amount increment day-on-day ratio is greater than the first proportion. If the storage amount increment day-on-day ratio is greater than the first proportion, the terminal device and/or the server determine that the data storage resource satisfies the high-risk diagnosis indicator in the use process.

The "proportion of small files" specifically refers to a ratio of the number of small files to the total number of small files (excluding folders), and is used to determine whether the number of small files is a reasonable value. When the proportion of small files is greater than the first ratio, the indicator "the proportion of small files being greater than the first ratio" is triggered, which indicates that the number of the current small files is large, and the number of small files is not a reasonable value. At this time, the device is prone to become slow, which may affect the service running on the device, and it is determined that the risk degree of the data storage resource is high. The specific value of the first ratio is not limited here, and may be set according to an actual scenario. For example, the first ratio may be 70% shown in FIG. 3.

In actual application, the terminal device and/or the server first calculate the proportion of small files in the foregoing manner, and then the terminal device and/or the server compare the proportion of small files with the first ratio, to determine whether the proportion of small files is greater than the first ratio. If the proportion of small files is greater than the first ratio, the terminal device and/or the server determine that the data storage resource satisfies the high-risk diagnosis indicator in the use process.

The "proportion of disk bad blocks" specifically refers to a ratio of the number of disks with bad blocks to the total number of disks, and is used to determine whether the remaining data storage resource is sufficient. When the proportion of disk bad blocks is greater than the first bad block proportion, the indicator "the proportion of disk bad blocks being greater than the first bad block proportion" is triggered, which indicates that the number of disks with bad blocks is currently large, and a situation of insufficient remaining data storage resource may occur. At this time, it is determined that the risk degree of the data storage resource is high. The specific value of the first bad block proportion is not limited here, and may be set according to an actual scenario. For example, the first bad block proportion may be 10% shown in FIG. 3.

In actual application, the terminal device and/or the server first calculate the proportion of disk bad blocks in the foregoing manner, and then the terminal device and/or the server compare the proportion of disk bad blocks with the first bad block proportion, to determine whether the proportion of disk bad blocks is greater than the first bad block proportion. If the proportion of disk bad blocks is greater than the first bad block proportion, the terminal device and/or the server determine that the data storage resource satisfies the high-risk diagnosis indicator in the use process.

In the use process of the data storage resource, if two tasks are written into the same partition at the same time or a storage component is abnormal, blocked or forbidden data writing may occur. The data write forbidding trigger duration is used to determine whether data is written smoothly. When the write forbidding trigger duration of the data is greater than the target duration, the indicator "the write forbidding trigger duration being greater than the target duration" is triggered, which indicates that the data is forbidden from being written for too long, and may affect the running service. Because the "write forbidding trigger duration" parameter is also related to the use of the data storage resource, it is determined that the risk degree of the data storage resource is high. The specific value of the target duration is not limited here, and may be set according to an actual scenario.

In actual application, the terminal device and/or the server first obtain the write forbidding trigger duration, and then the terminal device and/or the server compare the write forbidding trigger duration with the target duration, to determine whether the write forbidding trigger duration is greater than the target duration. If the write forbidding trigger duration is greater than the target duration, the terminal device and/or the server determine that the data storage resource satisfies the high-risk diagnosis indicator in the use process.

The "storage usage rate" is a ratio of used data storage resource to total data storage resources, and is used to determine whether the remaining data storage resource is sufficient. When the storage usage rate exceeds the target usage rate, the indicator "the storage usage rate exceeding the target usage rate" is triggered, which indicates that the remaining data storage resource may be insufficient, and it is determined that the risk degree of the data storage resource is high. The specific value of the target usage rate is not limited here, and may be set according to an actual scenario.

In actual application, the terminal device and/or the server first obtain the storage usage rate in the foregoing manner, and then the terminal device and/or the server compare the storage usage rate with the target usage rate, to determine whether the storage usage rate exceeds the target usage rate. If the storage usage rate exceeds the target usage rate, the terminal device and/or the server determine that the data storage resource satisfies the high-risk diagnosis indicator in the use process.

The "lifetime" specifically refers to the lifetime of a data table or the like. The lifetime is also called as time to live (TTL), which refers to a duration during which data is allowed to be stored in a data warehouse, and may also be understood as a duration during which data is allowed to be stored in a hard disk. In actual application, the data table may be used to store data. A smaller TTL value of the data table causes more frequent data update and more easily increases a burden on a device. A larger TTL value of the data table causes longer data storage duration, and the stored data may be out of date. Therefore, the TTL of the data table needs to be set, and the TTL needs to be set to an appropriate value. Generally, a recommended value of the TTL may be given, and this value is an appropriate TTL value. The setting of the TTL value should follow the recommended value of the TTL. Therefore, it is needed to determine whether the lifetime of the data table or the like is appropriate. When the set TTL of the lifetime is less than the target time, the indicator "the set lifetime being less than the recommended value" is triggered, which indicates that the currently set lifetime is unreasonable, and may cause data errors and cause the data to be deleted at this time, thereby affecting the currently running service. Because the "lifetime" parameter is also related to the use of the data storage resource, it is determined that the risk degree of the data storage resource is high.

In actual application, the terminal device and/or the server first obtain the lifetime corresponding to the data table or the like, and then the terminal device and/or the server compare the obtained lifetime with the recommended value, to determine whether the set lifetime is less than the recommended value. If the set lifetime is less than the recommended value, the terminal device and/or the server determine that the data storage resource satisfies the high-risk diagnosis indicator in the use process.

It may be understood that the foregoing listed high-risk diagnosis indicators in the storage assessment dimension belong to the indicator for representing that the data resource usage amount of the data storage resource exceeds the first data storage resource threshold, or belong to the indicator for representing that the data storage resource does not comply with the first data storage resource usage rule. The data storage resource includes the used data storage resource and the remaining data storage resource. The indicators such as the remaining storage usage duration being less than or equal to the first number of days, the storage amount increment day-on-day being greater than the first proportion, the proportion of disk bad blocks being greater than the first bad block proportion, the storage usage rate exceeding the target usage rate, etc. are all related to the used data storage resource or the remaining data storage resource, and therefore, these indicators belong to the indicator for representing that "the data resource usage amount of the data storage resource exceeds the first data storage resource threshold". For example, taking "remaining storage usage duration being less than or equal to the first number of days" as an example, the remaining storage usage duration is less than or equal to the first number of days, which indicates that the used data storage resource exceeds the first data storage resource threshold. In addition, the indicators such as the set lifetime being less than the recommended value, the proportion of small files being greater than the first ratio, the write forbidding trigger duration being greater than the target duration, etc. all involve the data storage resource usage rule, and thus belong to the indicator for representing that the data storage resource does not comply with the first data storage resource usage rule. For example, taking "the proportion of small files being greater than the first ratio" as an example, the first data storage resource usage rule may stipulate that the proportion of small files needs to be less than or equal to the first ratio. The remaining are similar, and are not described herein again.

Figure 4:
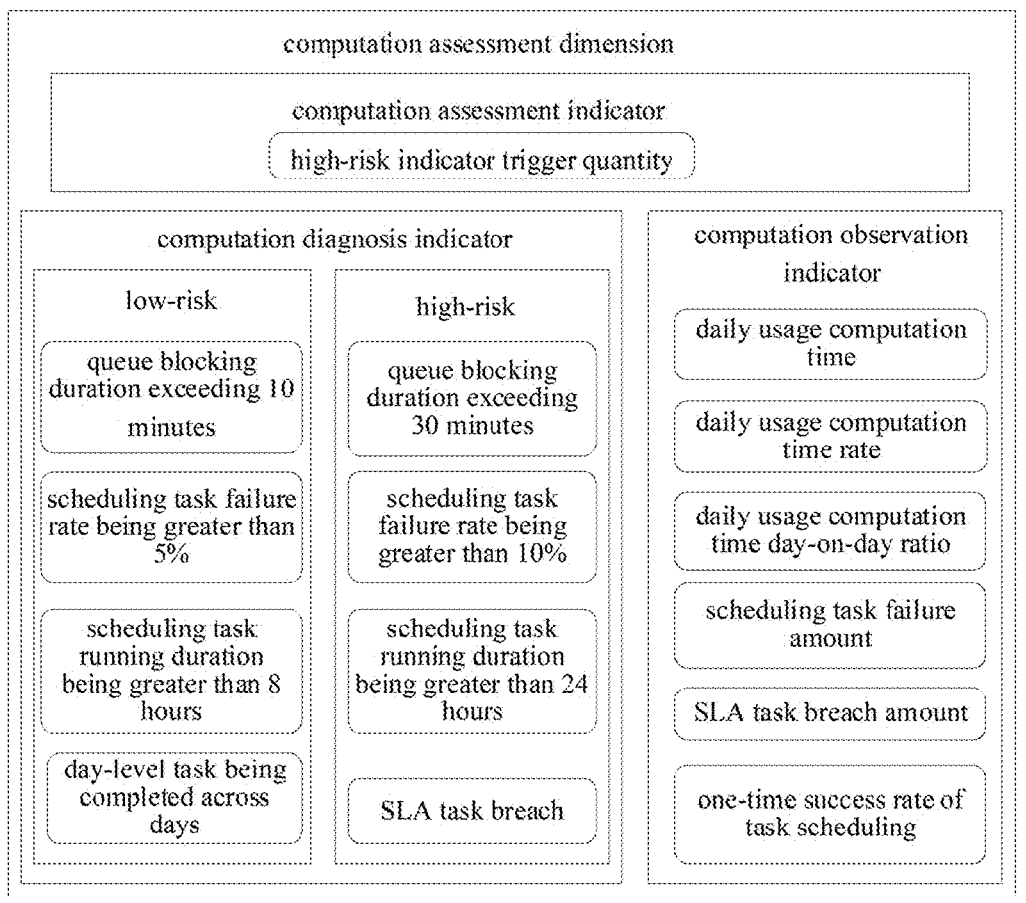
FIG. 4 is a schematic diagram of indicators for assessing a risk of a data computation resource according to an embodiment of the present disclosure.

Referring to FIG. 4, FIG. 4 is a schematic diagram of indicators for assessing a risk of a data computation resource according to an embodiment of the present disclosure. As an optional example, in combination with FIG. 4, the high-risk diagnosis indicator in the computation assessment dimension comprises one or more of the following:

a queue blocking duration exceeding a first duration, a scheduling task failure rate being greater than a first failure rate, a scheduling task running duration being greater than a first running duration, a queue usage computation time rate exceeding a first computation time rate, or a service level agreement (SLA) task breach.

The foregoing listed high-risk diagnosis indicators in the computation assessment dimension may be divided according to the dimensions of "task" and "queue" in the computation assessment dimension. For example, the indicators such as the queue blocking duration exceeding the first duration and the queue usage computation time rate exceeding the first computation time rate are high-risk diagnosis indicators related to the "queue". The indicators such as the scheduling task failure rate being greater than the first failure rate, the scheduling task running duration being greater than the first running duration, and the SLA task breach are high-risk diagnosis indicators related to the "task". In addition, the high-risk diagnosis indicators are not limited to those in the dimensions of the "task" and the "queue", and corresponding high-risk diagnosis indicators may also be constructed from the dimensions of stage, application, instance, and the like.

It may be understood that the queue blocking duration, the scheduling task failure rate, the scheduling task running duration, the queue usage computation time rate, the SLA task, and the like are all events related to the data computation resource in the use process. For example, taking indicators related to "queue" (such as the queue blocking duration and the queue usage computation time rate) as an example, data resources configured for the queue are 1000 cores of CPU and 10 TB of memory. When the queue is used, its data computation resource is consumed, and the consumed data computation resource may be expressed as computation time. The computation time may be understood as a unit for evaluating the size of data computation resources used by a task/queue. The computation time is obtained from CPU usage computation time and memory usage computation time. Specifically, the larger one of the CPU usage computation time and the memory usage computation time is taken as the computation time. It is determined that one CPU core used for one hour is considered as one computation time, and 4 GB of memory used for one hour is considered as one computation time. For example, a task uses one CPU core and 8 GB of memory, and the task runs for one hour, then the CPU usage computation time is one computation time (one computation time unit), and the memory usage computation time is two computation times (two computation time units), and then the computation time corresponding to the task is the larger one of the one computation time and the two computation times, that is, two computation times. The "task" is similar, and is not described herein again.

In addition, the queue blocking duration, the scheduling task failure rate, the scheduling task running duration, the queue usage computation time rate, the SLA task, and the like are all parameters for the data resource user. For example, if the data resource user is a department, the "SLA task" specifically refers to an SLA task constructed in the department. The remaining parameters are similar, and are not described herein again.

The "queue blocking duration" is a total suspension duration of instances in the queue, and is used to determine whether the data computation resource is normally used. When the "queue blocking duration" exceeds the first duration, it is considered that the total suspension duration of the instances in the queue is long, and the queue is blocked for a long time, which will continuously consume the data computation resource. At this time, it is determined that the data computation resource is not used normally, and the risk degree of the data computation resource corresponding to the queue is high. The specific value of the first duration is not limited here, and may be set according to an actual scenario, for example, it may be 30 minutes shown in FIG. 4.

In actual application, the terminal device and/or the server first obtain the queue blocking duration, and then the terminal device and/or the server compare the queue blocking duration with the first duration, to determine whether the queue blocking duration exceeds the first duration. If the queue blocking duration exceeds the first duration, the terminal device and/or the server determine that the data computation resource satisfies the high-risk diagnosis indicator in the use process.

The "scheduling task failure rate" is a ratio of the number of failed scheduling tasks to the total number of scheduling tasks, and is used to determine a waste of the data computation resource. When the scheduling task failure rate is greater than the first failure rate, it is determined that the scheduling task failure rate is high, and the data computation resource used by the failed tasks is wasted. At this time, it is determined that the waste of the data computation resource is high, and the risk degree of the data computation resource is high. The specific value of the first failure rate is not limited here, and may be set according to an actual scenario, for example, it may be 10% shown in FIG. 4.

In actual application, the terminal device and/or the server first obtain the scheduling task failure rate, and then the terminal device and/or the server compare the scheduling task failure rate with the first failure rate, to determine whether the scheduling task failure rate is greater than the first failure rate. If the scheduling task failure rate is greater than the first failure rate, the terminal device and/or the server determine that the data computation resource satisfies the high-risk diagnosis indicator in the use process.

The "scheduling task running duration" is a total consumption duration of the scheduling tasks, and is used to determine whether the scheduling tasks run for a long time. When the scheduling task running duration is greater than the first running duration, it indicates that the scheduling tasks run for a long time. The scheduling tasks that run for a long time are high-time-consuming tasks, which will continuously consume the data computation resource, resulting in non-release of the data computation resource, and may cause task suspension. At this time, it is determined that the risk degree of the data computation resource is high. The specific value of the first running duration is not limited here, and may be set according to an actual scenario, for example, it may be 24 hours shown in FIG. 4.

In actual application, the terminal device and/or the server first obtain the scheduling task running duration, and then the terminal device and/or the server compare the scheduling task running duration with the first running duration, to determine whether the scheduling task running duration is greater than the first running duration. If the scheduling task running duration is greater than the first running duration, the terminal device and/or the server determine that the data computation resource satisfies the high-risk diagnosis indicator in the use process.

The "queue usage computation time rate" specifically refers to a ratio of the queue usage computation time to total computation time, and is used to determine the situation of the queue load. The total computation time may be the total computation time of the data resource user. When the queue usage computation time rate exceeds the first computation time rate, it indicates that the queue load is too high, and the data computation resource consumed by the queue is large. There may be a problem when the queue is running, and at this time, it is determined that the risk degree of the data computation resource is high. The specific value of the first computation time rate is not limited here, and may be set according to an actual scenario.

In actual application, the terminal device and/or the server first obtain the queue usage computation time rate in the foregoing manner, and then the terminal device and/or the server compare the queue usage computation time rate with the first computation time rate, to determine whether the queue usage computation time rate exceeds the first computation time rate. If the queue usage computation time rate exceeds the first computation time rate, the terminal device and/or the server determine that the data computation resource satisfies the high-risk diagnosis indicator in the use process.

The SLA task is a task for which an SLA agreement is signed. Generally, the time for completing the SLA task is appointed. If the SLA task is not completed when the time is exceeded, it indicates the SLA task breach. For example, the appointed time for completing the SLA task is 2:30. Before 2:30, the SLA task needs to be output normally. However, if the SLA task is not completed when it is 2:30, it indicates the SLA task breach. The SLA task breach may cause a delay of subsequent related tasks. Through determining whether the SLA task breach occurs, timeliness of data output can be learned. In other words, the SLA task breach indicates that the data is not output in time, and at this time, there may be a problem with the data computation resource consumed by the SLA task, and it is determined that the risk degree of the data computation resource is high.

In actual application, the terminal device and/or the server first determine the SLA task, and then determine whether the SLA task is completed within the corresponding required time, to determine whether the SLA task breach occurs. If the SLA task breach occurs, the terminal device and/or the server determine that the data computation resource satisfies the high-risk diagnosis indicator in the use process.

It may be understood that the foregoing listed high-risk diagnosis indicators in the computation assessment dimension may all belong to the indicator for representing that the data resource usage amount of the data computation resource exceeds the first data computation resource threshold. For example, taking "queue blocking duration exceeding the first duration" as an example, when the queue blocking duration exceeds the first duration, it is considered that the data resource usage amount of the data computation resource is excessive, and has exceeded the first data computation resource threshold. The remaining indicators are similar, and are not described herein again.

S103: counting a high-risk indicator trigger quantity in the storage assessment dimension and a high-risk indicator trigger quantity in the computation assessment dimension, wherein the high-risk indicator trigger quantity in the storage assessment dimension is an amount of high-risk diagnosis indicators in the storage assessment dimension that are satisfied in a use process of the data storage resource, and the high-risk indicator trigger quantity in the computation assessment dimension is an amount of high-risk diagnosis indicators in the computation assessment dimension that are satisfied in a use process of the data computation resource.

After determining the at least one high-risk indicator in the storage assessment dimension, it may be determined whether the data storage resource triggers or satisfies the high-risk indicator in the storage assessment dimension in the use process. Specifically, it is determined whether some related events of the data storage resource in the use process trigger or satisfy the high-risk indicator in the storage assessment dimension. Then, the amount of high-risk diagnosis indicators in the storage assessment dimension that are triggered or satisfied in the use process of the data storage resource is counted.

For example, there are 10 high-risk diagnosis indicators in the storage assessment dimension, and the high-risk diagnosis indicators in the storage assessment dimension that are triggered in the use process of the data storage resource are 5 of them, and therefore the high-risk indicator trigger quantity in the storage assessment dimension is 5. An event (related to the use of the data storage resource) that triggers the high-risk diagnosis indicator in the storage assessment dimension is a high-risk event.

In addition, the high-risk indicator trigger quantity in the computation assessment dimension is similar, and is not described herein again.

Based on the foregoing content, in a possible implementation, the embodiment of the present disclosure provides a specific implementation of counting the high-risk indicator trigger quantity in the storage assessment dimension and the high-risk indicator trigger quantity in the computation assessment dimension. The specific implementation includes the following steps.

A1: determining an indicator value corresponding to the high-risk diagnosis indicator in the storage assessment dimension based on a use situation of the data storage resource, and determining the high-risk indicator trigger quantity in the storage assessment dimension based on the indicator value corresponding to the high-risk diagnosis indicator in the storage assessment dimension.

Specifically, when the use situation of the data storage resource is obtained, the remaining situation of the data storage resource can also be obtained. In the use process of the data storage resource, the indicator value corresponding to each high-risk diagnosis indicator in the storage assessment dimension listed above can be obtained. For example, the remaining storage usage duration is determined as 5 days based on the remaining situation of the data storage resource. If the first number of days is 10 days, an indicator value of the indicator "the remaining storage usage duration being less than or equal to the first number of days" is "Yes". The remaining indicators are similar, and are not described herein again.

It may be understood that as long as the indicator value is "Yes", it indicates that the indicator is triggered or satisfied. Therefore, the high-risk diagnosis indicators in the storage assessment dimension whose indicator values are "Yes" are counted to obtain the high-risk indicator trigger quantity in the storage assessment dimension.

A2: determining an indicator value corresponding to the high-risk diagnosis indicator in the computation assessment dimension based on a use situation of the data computation resource, and determine the high-risk indicator trigger quantity in the computation assessment dimension based on the indicator value corresponding to the high-risk diagnosis indicator in the computation assessment dimension.

Specifically, when the use situation of the data computation resource is obtained, the indicator value corresponding to each high-risk diagnosis indicator in the computation assessment dimension listed above can be obtained in the use process of the data computation resource. For example, whether an SLA task breach occurs is determined based on the completion time of the SLA task. If the SLA task breach does not occur, an indicator value of the indicator "SLA task breach" is "No". The remaining indicators are similar, and are not described herein again.

Therefore, the high-risk diagnosis indicators in the computation assessment dimension whose indicator values are "Yes" are counted to obtain the high-risk indicator trigger quantity in the computation assessment dimension.

S104: assessing a risk caused by improper use of the data storage resource based on the high-risk indicator trigger quantity in the storage assessment dimension, and assessing a risk caused by improper use of the data computation resource based on the high-risk indicator trigger quantity in the computation assessment dimension.

The high-risk indicator trigger quantity in the storage assessment dimension and the high-risk indicator trigger quantity in the computation assessment dimension are result-type indicators, which can directly assess risks of the data storage resource and the data computation resource, and intuitively determine whether there is a problem in the current data resource use. When the high-risk indicator trigger quantity reaches a certain number, it is determined that the risk caused by improper use of the cluster data resource is at a high degree. For example, if the number of high-risk diagnosis indicators in the storage assessment dimension is 3, and the high-risk indicator trigger quantity in the storage assessment dimension is 2, it is determined that the risk degree is high.

As an optional example, when it is determined that the risk caused by improper use of the data storage resource is at a high degree, it is determined that the risk level is the high-risk level. Similarly, when it is determined that the risk caused by improper use of the data computation resource is at a high degree, it is determined that the risk level is the high-risk level. In this case, the risk level may be pushed to the user, so that the user can perceive the risk in time and intervene and process in time.

In addition, the high-risk diagnosis indicator for obtaining the high-risk indicator trigger quantity is a process-type indicator, and the process-type indicator may be used for risk attribution. For example, a high-risk event can be learned through the triggered high-risk diagnosis indicator, and the high-risk event is the reason of the high risk, thereby implementing risk attribution.

In addition, the number of high-risk events in the storage assessment dimension and the number of high-risk events in the computation assessment dimension may also be counted. The risk caused by improper use of the data storage resource is assessed based on the number of high-risk events in the storage assessment dimension, and the risk caused by improper use of the data computation resource is assessed based on the number of high-risk events in the computation assessment dimension. When the number of high-risk events in the storage assessment dimension is high, it is determined that the data storage resource causes a risk due to improper use in the use process, and the risk degree is high. When the number of high-risk events in the computation assessment dimension is high, it is determined that the data computation resource causes a risk due to improper use in the use process, and the risk degree is high. The number of high-risk events in the storage assessment dimension is the number of events (related to the use of the data storage resource) that trigger the high-risk diagnosis indicator (any indicator can be used) in the storage assessment dimension. The number of high-risk events in the computation assessment dimension is the number of events (related to the use of the data computation resource) that trigger the high-risk diagnosis indicator (any indicator can be used) in the computation assessment dimension. For example, there are 10 events related to the use of the data storage resource. The events are matched with the high-risk diagnosis indicator in the storage assessment dimension. As long as any high-risk diagnosis indicator in the storage assessment dimension is triggered, it is determined that the event is the high-risk event in the storage assessment dimension. Therefore, the number of high-risk events in the storage assessment dimension can be counted, for example, 4.

It can be learned from the related content of S101 to S104 that in the embodiments of the present disclosure, the cluster data resource is divided into the data storage resource and the data computation resource, so that the division of the cluster data resource is more reasonable and closer to an actual situation. On this basis, the two assessment dimensions, namely, the storage assessment dimension and the computation assessment dimension, are obtained, and the risk in the use process of the data storage resource and the risk in the use process of the data computation resource are respectively assessed from the storage assessment dimension and the computation assessment dimension, so that the risk assessment of the cluster data resource in the use process can be more accurate. The high-risk indicator trigger quantity is used as the high-risk assessment indicator to directly assess the risk of the cluster data resource in the use process. A larger high-risk indicator trigger quantity indicates that the number of risk events is larger, and the risk degree of improper use of the cluster data resource is higher.

It can be learned that the foregoing content describes how to assess whether the risk level of the cluster data resource in the use process is the high-risk level. Before the high-risk problem of the cluster data resource occurs, it is also possible to assess whether the risk level of the cluster data resource in the use process is the low-risk level, and determine a low-risk problem of the cluster data resource in the use process, so as to perceive the risk of the cluster data resource earlier. Details are described in the following.

In a possible implementation, the method for assessing a risk caused by improper use of a cluster data resource according to the embodiment of the present disclosure may further include the following steps B1 to B3.

B1: obtaining at least one low-risk diagnosis indicator in the storage assessment dimension and at least one low-risk diagnosis indicator in the computation assessment dimension, wherein the low-risk diagnosis indicator in the storage assessment dimension comprises an indicator for representing that a data resource usage amount of the data storage resource exceeds a second data storage resource threshold and/or an indicator for representing that the data storage resource does not comply with a second data storage resource usage rule, and the low-risk diagnosis indicator in the computation assessment dimension comprises an indicator for representing that a data resource usage amount of the data computation resource exceeds a second data computation resource threshold; the second data storage resource threshold is less than the first data storage resource threshold, and the second data computation resource threshold is less than the first data computation resource threshold.

It can be learned that in the low-risk determination process of the data storage resource, the second data storage resource threshold is set to be less than the first data storage resource threshold, so as to indicate that a risk degree of the data storage resource is low when the low-risk diagnosis indicator in the storage assessment dimension is triggered. In the low-risk determination process of the data computation resource, the second data computation resource threshold is set to be less than the first data computation resource threshold, so as to indicate that a risk degree of the data computation resource is low when the low-risk diagnosis indicator in the computation assessment dimension is triggered.

Referring to FIG. 3 again, as shown in FIG. 3, the low-risk diagnosis indicator in the storage assessment dimension may comprise one or more of the following:

a remaining storage usage duration being less than or equal to a second number of days, a storage amount increment day-on-day ratio being greater than a second proportion, a proportion of small files being greater than a second ratio, or a proportion of disk bad blocks being greater than a second bad block proportion. The second number of days is greater than the first number of days, the second proportion is less than the first proportion, the second ratio is less than the first ratio, and the second bad block proportion is less than the first bad block proportion.

It may be understood that the remaining storage usage duration, the storage amount increment day-on-day ratio, the proportion of small files, the proportion of disk bad blocks, and the like are all events related to the data storage resource in the use process.

It may also be understood that the setting of conditions such as the second number of days being greater than the first number of days, the second proportion being less than the first proportion, the second ratio being less than the first ratio, and the second bad block proportion being less than the first bad block proportion is used to indicate that the risk degree of related events in the low-risk diagnosis indicator in the storage assessment dimension is low. For example, the second number of days may be 30 days shown in FIG. 3, the second proportion may be 200% shown in FIG. 3, the second ratio may be 50% shown in FIG. 3, and the second bad block proportion may be 5% shown in FIG. 3.

The foregoing listed low-risk diagnosis indicators in the storage assessment dimension belong to the indicator for representing that the data resource usage amount of the data storage resource exceeds the second data storage resource threshold and/or the indicator for representing that the data storage resource does not comply with the second data storage resource usage rule. The indicators such as the remaining storage usage duration being less than or equal to the second number of days, the storage amount increment day-on-day being greater than the second proportion, and the proportion of disk bad blocks being greater than the second bad block proportion are related to the used data storage resource or the remaining data storage resource, and therefore these indicators belong to the indicator for representing that "the data resource usage amount of the data storage resource exceeds the second data storage resource threshold". The indicator such as the proportion of small files being greater than the second ratio involves the data storage resource usage rule, and therefore belongs to the indicator for representing that the data storage resource does not comply with the second data storage resource usage rule. The first data storage resource usage rule may stipulate that the proportion of small files needs to be less than or equal to the second ratio.

Referring to FIG. 4 again, as shown in FIG. 4, the low-risk diagnosis indicator in the computation assessment dimension comprises one or more of the following:

a queue blocking duration exceeding a second duration, a queue overflow duration exceeding a target overflow duration, a scheduling task failure rate being greater than a second failure rate, a scheduling task running duration being greater than a second running duration, a waiting-to-pass concurrent tasks ratio exceeding a target proportion, a queue usage computation time rate exceeding a second computation time rate, or a day-level task being completed across days. The second duration is greater than the first duration, the second failure rate is less than the first failure rate, the second running duration is less than the first running duration, and the second computation time rate is less than the first computation time rate.

It may be understood that the queue blocking duration, the queue overflow duration, the scheduling task failure rate, the scheduling task running duration, the waiting-to-pass concurrent tasks ratio, the queue usage computation time rate, the day-level task, and the like are all events related to the data computation resource in the use process.

It may also be understood that the setting of conditions such as the second duration being greater than the first duration, the second failure rate being less than the first failure rate, the second running duration being less than the first running duration, and the second computation time rate being less than the first computation time rate is used to indicate that a risk degree of related events in the low-risk diagnosis indicator in the computation assessment dimension is low. For example, the second duration may be 10 minutes shown in FIG. 4, the second failure rate may be 5% shown in FIG. 4, and the second running duration may be 8 hours shown in FIG. 4.

In addition, the "queue overflow duration exceeding the target overflow duration" is used to indicate whether data output is timely. It can be learned that data resources used by some queues may exceed a configured data resource threshold. For example, a data resource threshold configured for a task queue is 1000 CPU cores and 10 TB of memory. It is allowed that the data resource used by the queue exceeds the configured data resource threshold, and an over-time duration when the data resource used by the queue exceeds the configured data resource threshold is the overflow duration. When the queue overflow duration exceeds the target overflow duration, it indicates that the overflow duration of the task queue has exceeded a normal value, and it is determined that the data computation resource has a risk but the risk degree is low. The specific value of the target overflow duration is not limited here, and may be set according to an actual scenario.

In actual application, the terminal device and/or the server first obtain the queue overflow duration, and then compare the queue overflow duration with the target overflow duration, to determine whether the queue overflow duration exceeds the target overflow duration. If the queue overflow duration exceeds the target overflow duration, the terminal device and/or the server determine that the data computation resource satisfies the low-risk diagnosis indicator in the use process.

In practice, some tasks are executed concurrently. When the number of concurrent tasks waiting to be executed is too large, the data computation resource may not be used for a long time, resulting in an idle situation of the data computation resource. The "waiting-to-pass concurrent tasks ratio" is a ratio of the number of concurrent tasks waiting to be executed to a total number of tasks. When the waiting-to-pass concurrent tasks ratio exceeds the target proportion, it is determined that the data computation resource has a risk but the risk degree is low. The specific value of the target proportion is not limited here, and may be set according to an actual scenario.

In actual application, the terminal device and/or the server first obtain the waiting-to-pass concurrent tasks ratio in the foregoing manner, and then compare the waiting-to-pass concurrent tasks ratio with the target proportion, to determine whether the waiting-to-pass concurrent tasks ratio exceeds the target proportion. If the waiting-to-pass concurrent tasks ratio exceeds the target proportion, the terminal device and/or the server determine that the data computation resource satisfies the low-risk diagnosis indicator in the use process.

The "day-level task being completed across days" indicates that a task that is required to be completed on the current day is not completed on the current day but is completed across days, thereby determining that the timeliness of data output is poor, and determining that the data computation resource used by the task has a risk but the risk degree is low.

In actual application, the terminal device and/or the server first obtain the completion time of the day-level task in the foregoing manner, and then determine whether the completion time of the day-level task is within a time range of the current day, to determine whether the day-level task is completed across days. If the day-level task is completed across days, the terminal device and/or the server determine that the data computation resource satisfies the low-risk diagnosis indicator in the use process.

It may be understood that the foregoing listed low-risk diagnosis indicators in the computation assessment dimension may all belong to the indicator for representing that the data resource usage amount of the data computation resource exceeds the second data computation resource threshold. For example, taking "the queue blocking duration exceeding the second duration" as an example, when the queue blocking duration exceeds the second duration, it is considered that the data resource usage amount of the data computation resource exceeds a normal value, which indicates that "the data resource usage amount of the data computation resource exceeds the second data computation resource threshold". The remaining indicators are similar, and are not described herein again.

B2: obtaining a low-risk indicator trigger quantity in the storage assessment dimension and a low-risk indicator trigger quantity in the computation assessment dimension, wherein the low-risk indicator trigger quantity in the storage assessment dimension is an amount of low-risk diagnosis indicators in the storage assessment dimension that are satisfied in a use process of the data storage resource, and the low-risk indicator trigger quantity in the computation assessment dimension is an amount of low-risk diagnosis indicators in the computation assessment dimension that are satisfied in a use process of the data computation resource.

In a possible implementation, the embodiment of the present disclosure provides a specific implementation of obtaining the low-risk indicator trigger quantity in the storage assessment dimension and the low-risk indicator trigger quantity in the computation assessment dimension. The specific implementation includes the following steps C1-C2.

C1: determining an indicator value corresponding to the low-risk diagnosis indicator in the storage assessment dimension based on a use situation of the data storage resource, and determining the low-risk indicator trigger quantity in the storage assessment dimension based on the indicator value corresponding to the low-risk diagnosis indicator in the storage assessment dimension.

C2: determining an indicator value corresponding to the low-risk diagnosis indicator in the computation assessment dimension based on a use situation of the data computation resource, and determining the low-risk indicator trigger quantity in the computation assessment dimension based on the indicator value corresponding to the low-risk diagnosis indicator in the computation assessment dimension.

It can be learned that the technical implementation of C1 to C2 is similar to that of A1 to A2, and is not described herein again. Details can be referred to A1 to A2.

B3: assessing a risk caused by improper use of the data storage resource based on the low-risk indicator trigger quantity in the storage assessment dimension, and assessing a risk caused by improper use of the data computation resource based on the low-risk indicator trigger quantity in the computation assessment dimension.

It can be learned that the remaining technical implementation of B1 to B3 is similar to that of S102 to S104, and is not described herein again. Details can be referred to S102 to S104.

In order to make the risk assessment of the data storage resource and the data computation resource more fine-grained, the embodiment of the present disclosure provides an observation indicator, which may also be referred to as a benefit indicator, and is used to assist in assessing the risk degree of the data storage resource and the data computation resource. Details can be referred to the following.

In a possible implementation, the method for assessing a risk caused by improper use of a cluster data resource according to the embodiment of the present disclosure may further include the following step:

D1: obtaining a risk observation indicator in the storage assessment dimension and a risk observation indicator in the computation assessment dimension.

As an optional example, in combination with FIG. 3, the risk observation indicator in the storage assessment dimension comprises one or more of the following:

a small file ranking result, a remaining storage amount, an average storage increment in a preset time period, a number of remaining storage available days, a daily additional storage amount, or a total number of small files.

It should be understood that the risk observation indicators in the storage assessment dimension are all for the data resource user. For example, if the data resource user is a department, the "small file ranking result" specifically refers to a small file ranking result in the department. The remaining parameters are similar, and are not described herein again.

The small file may be understood as a file with a storage usage space less than 256 MB. The small file may also be called as a first type of file. The "small file ranking result" may be exemplified as "Top 100 small files" shown in FIG. 3, and may be specifically ranked according to the size of the storage usage space of the file. The "total number of small files" is a total number of files with a storage usage space less than 256 MB. The "small file ranking result" and the "total number of small files" may be used to observe stability of small files, so as to observe whether there are too many small files.

The "remaining storage amount" represents a total remaining amount of the current data storage resource, and is a difference between a total storage amount of the data storage resource and a storage amount of the used data storage resource, and the unit may be GB. The "number of remaining storage available days" is a ratio of the remaining storage amount to an average storage increment in the recent 7 days, and the unit is day. The indicators such as the "remaining storage amount" and the "number of remaining storage available days" are used to observe the use risk of the data storage resource.

The "average storage increment in a preset time period" is a ratio of a total storage increment in the preset time period to the preset time period. For example, the preset time period is the recent 7 days, and the average storage increment in the recent 7 days is a ratio of the total storage increment in the recent 7 days to 7. The "average storage increment in a preset time period" is used to observe the use risk of the data storage resource.

The "daily additional storage amount" is a daily increment of the data storage resource, and may be used to observe the use risk of the data storage resource.

As an optional example, in combination with FIG. 4, the risk observation indicator in the computation assessment dimension comprises one or more of the following:

daily usage computation time, a daily usage computation time rate, a daily usage computation time day-on-day ratio, a scheduling task failure amount, a proportion of unfinished instances on a current day, a T+1 unfinished rate, an SLA task breach amount, a one-time success rate of task scheduling, a sum of task suspension duration in a cycle, or a number of queue tasks in the cycle.

It should be understood that the risk observation indicators in the computation assessment dimension are all for the data resource user. For example, if the data resource user is a department, the "SLA task breach amount" specifically refers to an SLA task breach amount in the department. The remaining parameters are similar, and are not described herein again.

The "daily usage computation time" is data computation resources used on the current day, which is expressed by using the computation time. The "daily usage computation time rate" is a ratio of the daily usage computation time to total computation time, and the total computation time may be total computation time in the recent 7 days, which is not limited here. The "daily usage computation time day-on-day ratio" is a ratio of the usage computation time of the current day to the usage computation time of yesterday. The indicators such as the daily usage computation time, the daily usage computation time rate, and the daily usage computation time day-on-day ratio are used to observe the stability of the data computation resource.

The "scheduling task failure amount" is the number of failed scheduling tasks, and the time scale may be the recent 7 days, which is not limited here. The "scheduling task failure amount" is used to observe the stability of the data computation resource. In addition, the risk observation indicator in the computation assessment dimension may further comprise a "proportion of tasks that still fail after retry", where the proportion of tasks that still fail after retry is a ratio of tasks that still fail after retry to retried tasks, and is used to observe the stability of the data computation resource.

There is a task in the data warehouse, which is a task of performing statistics on data one day later, and is represented as a T+1 task. For example, assuming that today is October 16, and the data output today is data of October 15. If data of October 15 is not output on October 16, it is determined that the task is not completed. The "T+1 unfinished rate" represents a proportion of unfinished T+1 tasks in all tasks, and is used to observe the stability of the data computation resource.

The "SLA task breach amount" is the number of SLA tasks with breach. The "one-time success rate of task scheduling" is a ratio of one-time successful task instances to a total task scheduling amount. The "sum of task suspension duration in a cycle" is a sum of suspension duration of all task instances that run in the cycle, and the cycle may be every day. The "number of queue tasks in the cycle" is the number of tasks that run in the queue in the cycle, and the cycle may be every hour. The indicators such as the "SLA task breach amount, the one-time success rate of task scheduling, the sum of task suspension duration in a cycle, and the number of queue tasks in the cycle" are all used to observe the stability of the data computation resource.

D2: performing risk assessment on the data storage resource and the data computation resource based on the risk observation indicator in the storage assessment dimension and the risk observation indicator in the computation assessment dimension.

The risk observation indicator in the storage assessment dimension is used to assist in assessing the risk of the data storage resource, and the risk observation indicator in the computation assessment dimension is used to assist in assessing the risk of the data computation resource, so that the risk assessment of the cluster data resource is more accurate, the range of assessment indicators is wider, and the assessment dimension is more abundant. For example, a smaller "remaining storage amount" may increase the risk of the data storage resource, and a larger "SLA task breach amount" may increase the risk of the data computation resource. The remaining indicators are similar, and are not described herein again.

A person skilled in the art may understand that in the foregoing method in the specific implementation, an order of describing the steps does not mean a strict execution order, and does not constitute any limitation on the implementation process. A specific execution order of the steps shall be determined according to functions and a possible internal logic thereof.

Based on the method for assessing a risk caused by improper use of a cluster data resource provided in the foregoing method embodiments, the embodiments of the present disclosure further provide an apparatus for assessing a risk caused by improper use of a cluster data resource. The apparatus for assessing a risk caused by improper use of a cluster data resource will be described below with reference to the accompanying drawings. The apparatus in the embodiments of the present disclosure solves problems in a similar principle to the method for assessing a risk caused by improper use of a cluster data resource in the foregoing embodiments of the present disclosure. Therefore, for implementation of the apparatus, reference may be made to implementation of the method, and details will not be repeated again.

Figure 5:
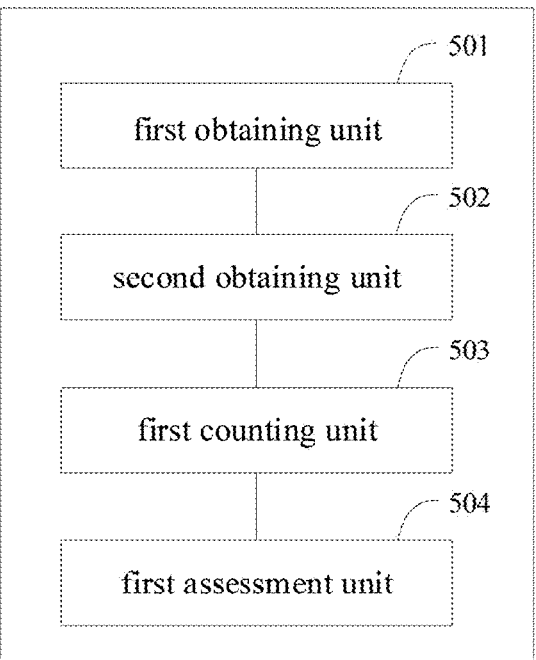
FIG. 5 is a schematic diagram of a structure of an apparatus for assessing a risk caused by improper use of a cluster data resource according to an embodiment of the present disclosure.

As shown in FIG. 5, FIG. 5 is a schematic diagram of a structure of an apparatus for assessing a risk caused by improper use of a cluster data resource according to an embodiment of the present disclosure. As shown in FIG. 5, an apparatus 500 for assessing a risk caused by improper use of a cluster data resource includes:

a first obtaining unit 501, configured to obtain an assessment dimension for assessing a risk of a cluster data resource, wherein the cluster data resource comprises a data storage resource and a data computation resource, and the assessment dimension comprises a storage assessment dimension and a computation assessment dimension;

a second obtaining unit 502, configured to obtain at least one high-risk diagnosis indicator in the storage assessment dimension and at least one high-risk diagnosis indicator in the computation assessment dimension, wherein the high-risk diagnosis indicator in the storage assessment dimension comprises an indicator for representing that a data resource usage amount of the data storage resource exceeds a first data storage resource threshold and/or an indicator for representing that the data storage resource does not comply with a first data storage resource usage rule, and the high-risk diagnosis indicator in the computation assessment dimension comprises an indicator for representing that a data resource usage amount of the data computation resource exceeds a first data computation resource threshold;

a first counting unit 503, configured to count a high-risk indicator trigger quantity in the storage assessment dimension and a high-risk indicator trigger quantity in the computation assessment dimension, wherein the high-risk indicator trigger quantity in the storage assessment dimension is an amount of high-risk diagnosis indicators in the storage assessment dimension that are satisfied in a use process of the data storage resource, and the high-risk indicator trigger quantity in the computation assessment dimension is an amount of high-risk diagnosis indicators in the computation assessment dimension that are satisfied in a use process of the data computation resource; and a first assessment unit 504, configured to assess a risk caused by improper use of the data storage resource based on the high-risk indicator trigger quantity in the storage assessment dimension, and assess a risk caused by improper use of the data computation resource based on the high-risk indicator trigger quantity in the computation assessment dimension.

In a possible implementation, the first counting unit 503 includes:

a first determining sub-unit, configured to determine an indicator value corresponding to the high-risk diagnosis indicator in the storage assessment dimension based on a use situation of the data storage resource, and determine the high-risk indicator trigger quantity in the storage assessment dimension based on the indicator value corresponding to the high-risk diagnosis indicator in the storage assessment dimension; and a second determining sub-unit, configured to determine an indicator value corresponding to the high-risk diagnosis indicator in the computation assessment dimension based on a use situation of the data computation resource, and determine the high-risk indicator trigger quantity in the computation assessment dimension based on the indicator value corresponding to the high-risk diagnosis indicator in the computation assessment dimension.

In a possible implementation, the high-risk diagnosis indicator in the storage assessment dimension comprises one or more of the following:

a remaining storage usage duration being less than or equal to a first number of days, a storage amount increment day-on-day ratio being greater than a first proportion, a proportion of small files being greater than a first ratio, a proportion of disk bad blocks being greater than a first bad block proportion, a write forbidding trigger duration being greater than a target duration, a storage usage rate exceeding a target usage rate, or a set lifetime being less than a recommended value.

The high-risk diagnosis indicator in the computation assessment dimension comprises one or more of the following:

a queue blocking duration exceeding a first duration, a scheduling task failure rate being greater than a first failure rate, a scheduling task running duration being greater than a first running duration, a queue usage computation time rate exceeding a first computation time rate, or an SLA task breach.

In a possible implementation, the apparatus further includes:

a third obtaining unit, configured to obtain at least one low-risk diagnosis indicator in the storage assessment dimension and at least one low-risk diagnosis indicator in the computation assessment dimension, wherein the low-risk diagnosis indicator in the storage assessment dimension comprises an indicator for representing that a data resource usage amount of the data storage resource exceeds a second data storage resource threshold and/or an indicator for representing that the data storage resource does not comply with a second data storage resource usage rule, and the low-risk diagnosis indicator in the computation assessment dimension comprises an indicator for representing that a data resource usage amount of the data computation resource exceeds a second data computation resource threshold; the second data storage resource threshold is less than the first data storage resource threshold, and the second data computation resource threshold is less than the first data computation resource threshold;

a second counting unit, configured to obtain a low-risk indicator trigger quantity in the storage assessment dimension and a low-risk indicator trigger quantity in the computation assessment dimension, wherein the low-risk indicator trigger quantity in the storage assessment dimension is an amount of low-risk diagnosis indicators in the storage assessment dimension that are satisfied in a use process of the data storage resource, and the low-risk indicator trigger quantity in the computation assessment dimension is an amount of low-risk diagnosis indicators in the computation assessment dimension that are satisfied in a use process of the data computation resource; and a second assessment unit, configured to assess a risk caused by improper use of the data storage resource based on the low-risk indicator trigger quantity in the storage assessment dimension, and assess a risk caused by improper use of the data computation resource based on the low-risk indicator trigger quantity in the computation assessment dimension.

In a possible implementation, the second counting unit includes:

a third determining sub-unit, configured to determine an indicator value corresponding to the low-risk diagnosis indicator in the storage assessment dimension based on a use situation of the data storage resource, and determine the low-risk indicator trigger quantity in the storage assessment dimension based on the indicator value corresponding to the low-risk diagnosis indicator in the storage assessment dimension; and a fourth determining sub-unit, configured to determine an indicator value corresponding to the low-risk diagnosis indicator in the computation assessment dimension based on a use situation of the data computation resource, and determine the low-risk indicator trigger quantity in the computation assessment dimension based on the indicator value corresponding to the low-risk diagnosis indicator in the computation assessment dimension.

In a possible implementation, the low-risk diagnosis indicator in the storage assessment dimension comprises one or more of the following:

a remaining storage usage duration being less than or equal to a second number of days, a storage amount increment day-on-day ratio being greater than a second proportion, a proportion of small files being greater than a second ratio, or a proportion of disk bad blocks being greater than a second bad block proportion. The second number of days is greater than the first number of days, the second proportion is less than the first proportion, the second ratio is less than the first ratio, and the bad block proportion is less than the first bad block proportion.

The low-risk diagnosis indicator in the computation assessment dimension comprises one or more of the following:

a queue blocking duration exceeding a second duration, a queue overflow duration exceeding a target overflow duration, a scheduling task failure rate being greater than a second failure rate, a scheduling task running duration being greater than a second running duration, a waiting-to-pass concurrent tasks ratio exceeding a target proportion, a queue usage computation time rate exceeding a second computation time rate, or a day-level task being completed across days. The second duration is greater than the first duration, the second failure rate is less than the first failure rate, the second running duration is less than the first running duration, and the second computation time rate is less than the first computation time rate.

In a possible implementation, the apparatus further includes:

a fourth obtaining unit, configured to obtain a risk observation indicator in the storage assessment dimension and a risk observation indicator in the computation assessment dimension; and a third assessment unit, configured to perform risk assessment on the data storage resource and the data computation resource based on the risk observation indicator in the storage assessment dimension and the risk observation indicator in the computation assessment dimension.

The risk observation indicator in the storage assessment dimension comprises one or more of the following:

a small file ranking result, a remaining storage amount, an average storage increment in a preset time period, a number of remaining storage available days, a daily additional storage amount, or a total number of small files.

The risk observation indicator in the computation assessment dimension comprises one or more of the following:

daily usage computation time, a daily usage computation time rate, a daily usage computation time day-on-day ratio, a scheduling task failure amount, a proportion of unfinished instances on a current day, a T+1 unfinished rate, an SLA task breach amount, a one-time success rate of task scheduling, a sum of task suspension duration in a cycle, or a number of queue tasks in the cycle.

Based on the implementations provided in the foregoing aspects, the present disclosure may also perform further combination to provide more implementations.

It should be noted that for a specific implementation of each unit in the embodiment, reference may be made to related descriptions in the foregoing method embodiments. The division of the units in the embodiments of the present disclosure is schematic, and is merely a division by logical functions. In actual implementation, there may be other division manners. Each functional unit in the embodiments of the present disclosure may be integrated into one processing unit, or may exist alone physically, or two or more units may be integrated into one unit. For example, in the foregoing embodiments, the processing unit and the sending unit may be the same unit, or may be different units. The foregoing integrated unit may be implemented in a form of hardware, or may be implemented in a form of a software functional unit.

Based on the method for assessing a risk caused by improper use of a cluster data resource provided in the foregoing method embodiments, the present disclosure further provides an electronic device, which comprises: one or more processors, and a storage apparatus having one or more programs stored thereon. When the one or more programs are executed by the one or more processors, the one or more processors are caused to implement the method for assessing a risk caused by improper use of a cluster data resource according to any one of the foregoing embodiments.

Figure 6:
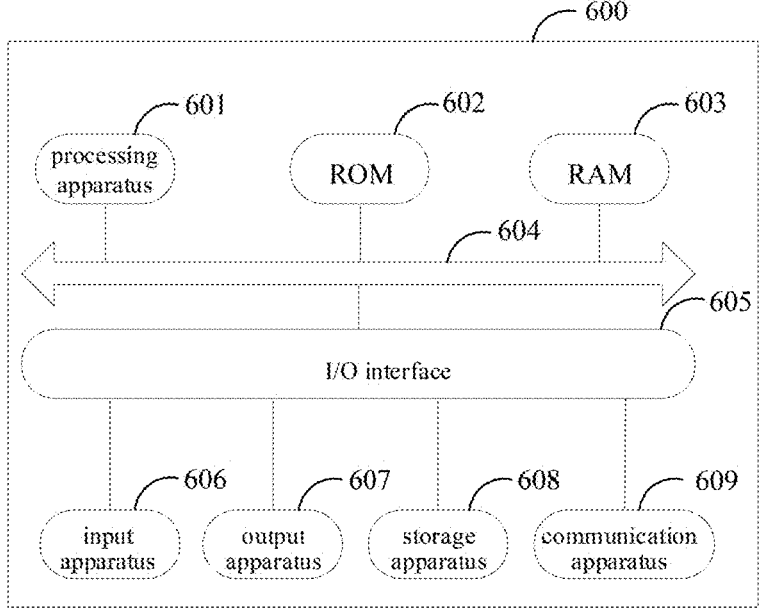
FIG. 6 is a schematic diagram of a basic structure of an electronic device according to an embodiment of the present disclosure.

Referring to FIG. 6 below, which shows a schematic diagram of a structure of an electronic device 600 suitable for implementing the embodiments of the present disclosure. The terminal device in the embodiments of the present disclosure may include, but is not limited to, mobile terminals such as a mobile phone, a notebook computer, a digital broadcast receiver, a personal digital assistant (PDA), a portable android device (PAD), a portable media player (PMP), and a vehicle-mounted terminal (such as a vehicle navigation terminal), and fixed terminals such as a digital TV (television) and a desktop computer. The electronic device shown in FIG. 6 is merely an example, and shall not impose any limitation on the function and scope of use of the embodiments of the present disclosure.

As shown in FIG. 6, the electronic device 600 may include a processing apparatus (for example, a central processor, a graphics processor, and the like) 601 that may perform a variety of appropriate actions and processing in accordance with a program stored in a read-only memory (ROM) 602 or a program loaded from a storage apparatus 608 into a random access memory (RAM) 603. The RAM 603 further stores various programs and data required for the operation of the electronic device 600. The processing apparatus 601, the ROM 602, and the RAM 603 are connected to each other through a bus 604. An input/output (I/O) interface 605 is also connected to the bus 604.

Generally, the following apparatuses may be connected to the I/O interface 605: an input apparatus 606 including, for example, a touch screen, a touchpad, a keyboard, a mouse, a camera, a microphone, an accelerometer, and a gyroscope; an output apparatus 607 including, for example, a liquid crystal display (LCD), a speaker, and a vibrator; the storage apparatus 608 including, for example, a tape and a hard disk; and a communication apparatus 609. The communication apparatus 609 may allow the electronic device 600 to perform wireless or wired communication with other devices to exchange data. Although FIG. 6 shows the electronic device 600 having various apparatuses, it should be understood that it is not required to implement or have all of the shown apparatuses. It may be an alternative to implement or have more or fewer apparatuses.

In particular, according to an embodiment of the present disclosure, the process described above with reference to the flowcharts may be implemented as a computer software program. For example, the embodiment of the present disclosure includes a computer program product, which includes a computer program carried on a non-transitory computer-readable medium, where the computer program includes program code for performing the method shown in the flowchart. In such an embodiment, the computer program may be downloaded from a network through the communication apparatus 609, installed from the storage apparatus 608, or installed from the ROM 602. When the computer program is executed by the processing apparatus 601, the above-mentioned functions defined in the method of the embodiments of the present disclosure are performed.

The electronic device provided in the embodiment of the present disclosure and the method for assessing a risk caused by improper use of a cluster data resource provided in the foregoing embodiments belong to the same inventive concept. For technical details not described in detail in this embodiment, reference may be made to the foregoing embodiments, and this embodiment and the foregoing embodiments have the same beneficial effects.

Based on the method for assessing a risk caused by improper use of a cluster data resource provided in the foregoing method embodiments, the embodiment of the present disclosure provides a computer-readable medium having a computer program stored thereon. When the program is executed by a processor, the method for assessing a risk caused by improper use of a cluster data resource according to any one of the foregoing embodiments is implemented.

It should be noted that the foregoing computer-readable medium described in the disclosure may be a computer-readable signal medium, a computer-readable storage medium, or any combination thereof. The computer-readable storage medium may be, for example, but not limited to, electric, magnetic, optical, electromagnetic, infrared, or semiconductor systems, apparatuses, or devices, or any combination thereof. A more specific example of the computer-readable storage medium may include, but is not limited to: an electrical connection having one or more wires, a portable computer magnetic disk, a hard disk, a random access memory (RAM), a read-only memory (ROM), an erasable programmable read-only memory (EPROM or flash memory), an optic fiber, a portable compact disk read-only memory (CD-ROM), an optical storage device, a magnetic storage device, or any suitable combination thereof. In the disclosure, the computer-readable storage medium may be any tangible medium containing or storing a program, which may be used by or in combination with an instruction execution system, apparatus, or device. In the disclosure, the computer-readable signal medium may include a data signal propagated in a baseband or as a part of a carrier, the data signal carrying computer-readable program code. The propagated data signal may be in various forms, including but not limited to an electromagnetic signal, an optical signal, or any suitable combination thereof. The computer-readable signal medium may also be any computer-readable medium other than the computer-readable storage medium. The computer-readable signal medium can send, propagate, or transmit a program used by or in combination with an instruction execution system, apparatus, or device. The program code contained in the computer-readable medium may be transmitted by any suitable medium, including but not limited to electric wires, optical cables, radio frequency (RF), and the like, or any suitable combination thereof.

In some implementations, the client and the server may communicate by using any currently known or future-developed network protocol such as a hyper text transfer protocol (HTTP), and may be connected to digital data communication (for example, a communication network) in any form or medium. Examples of the communication network include a local area network ("LAN"), a wide area network ("WAN"), an internetwork (for example, the Internet), a peer-to-peer network (for example, an ad hoc peer-to-peer network), and any currently known or future-developed network.

The foregoing computer-readable medium may be contained in the foregoing electronic device, or may exist independently without being assembled into the electronic device.

The foregoing computer-readable medium carries one or more programs, and when the one or more programs are executed by the electronic device, the electronic device is enabled to execute the method for assessing a risk caused by improper use of a cluster data resource.

Computer program code for performing operations of the present disclosure may be written in one or more programming languages or a combination thereof, where the programming languages include but are not limited to an object-oriented programming language, such as Java, Smalltalk, and C++, and further include conventional procedural programming languages, such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the case involving the remote computer, the remote computer may be connected to a computer of the user through any type of network, including a local area network (LAN) or a wide area network (WAN), or may be connected to an external computer (for example, connected through the Internet by using an Internet service provider).

The flowcharts and block diagrams in the accompanying drawings illustrate a possible system architecture, functions, and operations of the system, the method, and the computer program product according to various embodiments of the present disclosure. In this regard, each block in the flowchart or block diagram may represent a module, program segment, or part of code, and the module, program segment, or part of code contains one or more executable instructions for implementing the specified logical functions. It should also be noted that in some alternative implementations, the functions marked in the blocks may also occur in an order different from that marked in the accompanying drawings. For example, two blocks shown in succession may actually be executed substantially in parallel, or they may sometimes be executed in a reverse order, depending on a function involved. It should also be noted that each block in the block diagram and/or the flowchart, and a combination of the blocks in the block diagram and/or the flowchart may be implemented by a dedicated hardware-based system that executes specified functions or operations, or may be implemented by a combination of dedicated hardware and computer instructions.

The units involved in the embodiments described in the disclosure can be implemented by means of software, or can be implemented by means of hardware. The name of a unit/module does not constitute a limitation on the unit in some cases. For example, a voice data acquisition module may alternatively be described as a "data acquisition module".

The functions described herein above may be performed at least partially by one or more hardware logic components. For example, without limitation, exemplary types of hardware logic components that can be used include: a field programmable gate array (FPGA), an application-specific integrated circuit (ASIC), an application-specific standard product (ASSP), a system on chip (SOC), a complex programmable logic device (CPLD), and the like.

In the context of the disclosure, a machine-readable medium may be a tangible medium that may contain or store a program used by or in combination with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatus, or devices, or any suitable combination thereof. A more specific example of the machine-readable storage medium may include an electrical connection based on one or more wires, a portable computer disk, a hard disk, a random access memory (RAM), a read-only memory (ROM), an erasable programmable read-only memory (EPROM or flash memory), an optic fiber, a portable compact disk read-only memory (CD-ROM), an optical storage device, a magnetic storage device, or any suitable combination thereof.

It should be noted that in the disclosure, the embodiments are described in a progressive manner, and each embodiment focuses on differences from the other embodiments. For the same or similar parts between the embodiments, reference may be made to each other. For the system or apparatus disclosed in the embodiments, since it corresponds to the method disclosed in the embodiments, the description is relatively simple, and for the related parts, reference may be made to the description of the method section.

It should be understood that in the present disclosure, "at least one (item)" means one or more, and "a plurality of" means two or more. "And/or" is used to describe an association relationship between associated objects, and indicates that there may be three relationships. For example, "A and/or B" may indicate the following three cases: only A exists, only B exists, and both A and B exist, where A and B may be singular or plural. The character "/" generally indicates that the associated objects before and after are in an "or" relationship. "At least one of the following items (pieces)" or a similar expression thereof means any combination of these items, including a single item (piece) or any combination of a plurality of items (pieces). For example, at least one of a, b, or c may represent: a, b, c, "a and b", "a and c", "b and c", or "a, b, and c", where a, b, and c may be singular or plural.

It should also be noted that in this specification, relation terms such as "first" and "second" are merely used to distinguish one entity or operation from another entity or operation, and do not necessarily require or imply that there is any such actual relationship or order between these entities or operations. Moreover, the term "include/comprise" or any other variant thereof is intended to cover non-exclusive inclusion, so that a process, method, article, or apparatus that includes a series of elements not only includes those elements, but also includes other elements not explicitly listed, or further includes elements inherent to such process, method, article, or apparatus. Without more restrictions, the element defined by the statement "include/comprise a . . . " does not exclude the presence of another identical element in the process, method, article, or apparatus that includes the element.

The steps of a method or algorithm described in connection with the embodiments disclosed herein may be implemented directly in hardware, a software module executed by a processor, or a combination of the two. The software module may be placed in random access memory (RAM), memory, read-only memory (ROM), electrically programmable ROM, electrically erasable programmable ROM, registers, hard disks, removable disks, CD-ROMs, or any other form of storage medium known in the art.

The foregoing descriptions of the disclosed embodiments enable those skilled in the art to implement or use the present disclosure. Various modifications to these embodiments will be readily apparent to those skilled in the art, and the general principles defined herein may be implemented in other embodiments without departing from the spirit or scope of the present disclosure. Therefore, the present disclosure is not limited to the embodiments shown herein, but is to comply with the widest scope consistent with the principles and novel features disclosed herein.

The invention claimed is:

1. A method for assessing a risk caused by improper use of a cluster data resource, applied to a scenario of resource allocation of a department, wherein the method comprises:

dividing, according to an impact degree of a risk caused by improper use of a data resource on a service, risk levels in a use process of the cluster data resource into three levels: a low-risk level, a high-risk level, and an accident level;

allocating the cluster data resource to the department;

obtaining an assessment dimension for assessing the risk of the cluster data resource, wherein the cluster data resource comprises a data storage resource and a data computation resource, and the assessment dimension comprises a storage assessment dimension and a computation assessment dimension;

obtaining at least one high-risk diagnosis indicator in the storage assessment dimension and at least one high-risk diagnosis indicator in the computation assessment dimension, wherein the high-risk diagnosis indicator in the storage assessment dimension, indicated for the storage assessment dimension, comprises an indicator for representing that a data resource usage amount of the data storage resource exceeds a first data storage resource threshold and/or an indicator for representing that the data storage resource does not comply with a first data storage resource usage rule, and the high-risk diagnosis indicator in the computation assessment dimension, indicated for the computation assessment dimension, comprises an indicator for representing that a data resource usage amount of the data computation resource exceeds a first data computation resource threshold;

counting a high-risk indicator trigger quantity in the storage assessment dimension and a high-risk indicator trigger quantity in the computation assessment dimension, wherein the high-risk indicator trigger quantity in the storage assessment dimension is an amount of high-risk diagnosis indicators in the storage assessment dimension that are satisfied in a use process of the data storage resource, and the high-risk indicator trigger quantity in the computation assessment dimension is an amount of high-risk diagnosis indicators in the computation assessment dimension that are satisfied in a use process of the data computation resource; and assessing a risk caused by improper use of the data storage resource based on the high-risk indicator trigger quantity in the storage assessment dimension, and assessing a risk caused by improper use of the data computation resource based on the high-risk indicator trigger quantity in the computation assessment dimension.

2. The method according to claim 1, wherein counting the high-risk indicator trigger quantity in the storage assessment dimension and the high-risk indicator trigger quantity in the computation assessment dimension comprises:

determining indicator values corresponding to high-risk diagnosis indicators in the storage assessment dimension based on a usage situation of the data storage resource, and determining the high-risk indicator trigger quantity in the storage assessment dimension based on the indicator values corresponding to the high-risk diagnosis indicators in the storage assessment dimension; and determining indicator values corresponding to high-risk diagnosis indicators in the computation assessment dimension based on a usage situation of the data computation resource, and determining the high-risk indicator trigger quantity in the computation assessment dimension based on the indicator values corresponding to the high-risk diagnosis indicators in the computation assessment dimension.

3. The method according to claim 2, wherein the high-risk diagnosis indicator in the storage assessment dimension comprises one or more of following:

a remaining storage usage duration being less than or equal to a first number of days, a storage amount increment day-on-day ratio being greater than a first proportion, a proportion of small files being greater than a first ratio, a proportion of disk bad blocks being greater than a first bad block proportion, a write forbidding trigger duration being greater than a third duration, a storage usage rate exceeding a first usage rate, or a set lifetime being less than a recommended value; and the high-risk diagnosis indicator in the computation assessment dimension comprises one or more of following:

a queue blocking duration exceeding a first duration, a scheduling task failure rate being greater than a first failure rate, a scheduling task running duration being greater than a first running duration, a queue usage computation time rate exceeding a first computation time rate, or a service level agreement task breach.

4. The method according to claim 3, further comprising:

obtaining at least one low-risk diagnosis indicator in the storage assessment dimension and at least one low-risk diagnosis indicator in the computation assessment dimension, wherein the low-risk diagnosis indicator in the storage assessment dimension comprises an indicator for representing that the data resource usage amount of the data storage resource exceeds a second data storage resource threshold and/or an indicator for representing that the data storage resource does not comply with a second data storage resource usage rule, the low-risk diagnosis indicator in the computation assessment dimension comprises an indicator for representing that the data resource usage amount of the data computation resource exceeds a second data computation resource threshold, the second data storage resource threshold is less than the first data storage resource threshold, and the second data computation resource threshold is less than the first data computation resource threshold;

obtaining a low-risk indicator trigger quantity in the storage assessment dimension and a low-risk indicator trigger quantity in the computation assessment dimension, wherein the low-risk indicator trigger quantity in the storage assessment dimension is an amount of low-risk diagnosis indicators in the storage assessment dimension that are satisfied in the use process of the data storage resource, and the low-risk indicator trigger quantity in the computation assessment dimension is an amount of low-risk diagnosis indicators in the computation assessment dimension that are satisfied in the use process of the data computation resource; and assessing the risk caused by improper use of the data storage resource based on the low-risk indicator trigger quantity in the storage assessment dimension, and assessing the risk caused by improper use of the data computation resource based on the low-risk indicator trigger quantity in the computation assessment dimension.

5. The method according to claim 4, wherein obtaining the low-risk indicator trigger quantity in the storage assessment dimension and the low-risk indicator trigger quantity in the computation assessment dimension comprises:

determining indicator values corresponding to low-risk diagnosis indicators in the storage assessment dimension based on the usage situation of the data storage resource, and determining the low-risk indicator trigger quantity in the storage assessment dimension based on the indicator values corresponding to the low-risk diagnosis indicators in the storage assessment dimension; and determining indicator values corresponding to low-risk diagnosis indicators in the computation assessment dimension based on the usage situation of the data computation resource, and determining the low-risk indicator trigger quantity in the computation assessment dimension based on the indicator values corresponding to the low-risk diagnosis indicators in the computation assessment dimension.

6. The method according to claim 5, wherein the low-risk diagnosis indicator in the storage assessment dimension comprises one or more of following:

the remaining storage usage duration being less than or equal to a second number of days, the storage amount increment day-on-day ratio being greater than a second proportion, the proportion of small files being greater than a second ratio, or the proportion of disk bad blocks being greater than a second bad block proportion, wherein the second number of days is greater than the first number of days, the second proportion is less than the first proportion, the second ratio is less than the first ratio, and the second bad block proportion is less than the first bad block proportion; and the low-risk diagnosis indicator in the computation assessment dimension comprises one or more of following:

the queue blocking duration exceeding a second duration, a queue overflow duration exceeding a first overflow duration, the scheduling task failure rate being greater than a second failure rate, the scheduling task running duration being greater than a second running duration, a waiting-to-pass concurrent tasks ratio exceeding a third proportion, the queue usage computation time rate exceeding a second computation time rate, or a day-level task being completed across days, wherein the second duration is greater than the first duration, the second failure rate is less than the first failure rate, the second running duration is less than the first running duration, and the second computation time rate is less than the first computation time rate.

7. The method according to claim 1, further comprising:
obtaining a risk observation indicator in the storage assessment dimension and a risk observation indicator in the computation assessment dimension; and performing risk assessment on the data storage resource and the data computation resource based on the risk observation indicator in the storage assessment dimension and the risk observation indicator in the computation assessment dimension, wherein the risk observation indicator in the storage assessment dimension comprises one or more of following:

a small file ranking result, a remaining storage amount, an average storage increment in a time period, a number of remaining storage available days, a daily additional storage amount, or a total number of small files; and the risk observation indicator in the computation assessment dimension comprises one or more of following:

daily usage computation time, a daily usage computation time rate, a daily usage computation time day-on-day ratio, a scheduling task failure amount, a proportion of unfinished instances on a current day, a T+1 unfinished rate, a service level agreement task breach amount, a one-time success rate of task scheduling, a sum of task suspension durations in a cycle, or a number of queue tasks in the cycle.

8. An electronic device, applied to a scenario of resource allocation of a department, wherein the electronic device comprises:

one or more processors; and a storage apparatus storing one or more programs, wherein the one or more programs, when executed by the one or more processors, cause the one or more processors to implement a method for assessing a risk caused by improper use of a cluster data resource, the method comprising:

dividing, according to an impact degree of a risk caused by improper use of a data resource on a service, risk levels in a use process of the cluster data resource into three levels: a low-risk level, a high-risk level, and an accident level;

allocating the cluster data resource to the department;

obtaining an assessment dimension for assessing the risk of the cluster data resource, wherein the cluster data resource comprises a data storage resource and a data computation resource, and the assessment dimension comprises a storage assessment dimension and a computation assessment dimension;

obtaining at least one high-risk diagnosis indicator in the storage assessment dimension and at least one high-risk diagnosis indicator in the computation assessment dimension, wherein the high-risk diagnosis indicator in the storage assessment dimension, indicated for the storage assessment dimension, comprises an indicator for representing that a data resource usage amount of the data storage resource exceeds a first data storage resource threshold and/or an indicator for representing that the data storage resource does not comply with a first data storage resource usage rule, and the high-risk diagnosis indicator in the computation assessment dimension, indicated for the computation assessment dimension, comprises an indicator for representing that a data resource usage amount of the data computation resource exceeds a first data computation resource threshold;

counting a high-risk indicator trigger quantity in the storage assessment dimension and a high-risk indicator trigger quantity in the computation assessment dimension, wherein the high-risk indicator trigger quantity in the storage assessment dimension is an amount of high-risk diagnosis indicators in the storage assessment dimension that are satisfied in a use process of the data storage resource, and the high-risk indicator trigger quantity in the computation assessment dimension is an amount of high-risk diagnosis indicators in the computation assessment dimension that are satisfied in a use process of the data computation resource; and assessing a risk caused by improper use of the data storage resource based on the high-risk indicator trigger quantity in the storage assessment dimension, and assessing a risk caused by improper use of the data computation resource based on the high-risk indicator trigger quantity in the computation assessment dimension.

9. The electronic device according to claim 8, wherein counting the high-risk indicator trigger quantity in the storage assessment dimension and the high-risk indicator trigger quantity in the computation assessment dimension comprises:

determining indicator values corresponding to high-risk diagnosis indicators in the storage assessment dimension based on a usage situation of the data storage resource, and determining the high-risk indicator trigger quantity in the storage assessment dimension based on the indicator values corresponding to the high-risk diagnosis indicators in the storage assessment dimension; and determining indicator values corresponding to high-risk diagnosis indicators in the computation assessment dimension based on a usage situation of the data computation resource, and determining the high-risk indicator trigger quantity in the computation assessment dimension based on the indicator values corresponding to the high-risk diagnosis indicators in the computation assessment dimension.

10. The electronic device according to claim 9, wherein the high-risk diagnosis indicator in the storage assessment dimension comprises one or more of following:

a remaining storage usage duration being less than or equal to a first number of days, a storage amount increment day-on-day ratio being greater than a first proportion, a proportion of small files being greater than a first ratio, a proportion of disk bad blocks being greater than a first bad block proportion, a write forbidding trigger duration being greater than a third duration, a storage usage rate exceeding a first usage rate, or a set lifetime being less than a recommended value; and the high-risk diagnosis indicator in the computation assessment dimension comprises one or more of following:

a queue blocking duration exceeding a first duration, a scheduling task failure rate being greater than a first failure rate, a scheduling task running duration being greater than a first running duration, a queue usage computation time rate exceeding a first computation time rate, or a service level agreement task breach.

11. The electronic device according to claim 10, wherein the method further comprises:

obtaining at least one low-risk diagnosis indicator in the storage assessment dimension and at least one low-risk diagnosis indicator in the computation assessment dimension, wherein the low-risk diagnosis indicator in the storage assessment dimension comprises an indicator for representing that the data resource usage amount of the data storage resource exceeds a second data storage resource threshold and/or an indicator for representing that the data storage resource does not comply with a second data storage resource usage rule, the low-risk diagnosis indicator in the computation assessment dimension comprises an indicator for representing that the data resource usage amount of the data computation resource exceeds a second data computation resource threshold, the second data storage resource threshold is less than the first data storage resource threshold, and the second data computation resource threshold is less than the first data computation resource threshold;

obtaining a low-risk indicator trigger quantity in the storage assessment dimension and a low-risk indicator trigger quantity in the computation assessment dimension, wherein the low-risk indicator trigger quantity in the storage assessment dimension is an amount of low-risk diagnosis indicators in the storage assessment dimension that are satisfied in the use process of the data storage resource, and the low-risk indicator trigger quantity in the computation assessment dimension is an amount of low-risk diagnosis indicators in the computation assessment dimension that are satisfied in the use process of the data computation resource; and assessing the risk caused by improper use of the data storage resource based on the low-risk indicator trigger quantity in the storage assessment dimension, and assessing the risk caused by improper use of the data computation resource based on the low-risk indicator trigger quantity in the computation assessment dimension.

12. The electronic device according to claim 11, wherein obtaining the low-risk indicator trigger quantity in the storage assessment dimension and the low-risk indicator trigger quantity in the computation assessment dimension comprises:

determining indicator values corresponding to low-risk diagnosis indicators in the storage assessment dimension based on the usage situation of the data storage resource, and determining the low-risk indicator trigger quantity in the storage assessment dimension based on the indicator values corresponding to the low-risk diagnosis indicators in the storage assessment dimension; and determining indicator values corresponding to low-risk diagnosis indicators in the computation assessment dimension based on the usage situation of the data computation resource, and determining the low-risk indicator trigger quantity in the computation assessment dimension based on the indicator values corresponding to the low-risk diagnosis indicators in the computation assessment dimension.

13. The electronic device according to claim 12, wherein the low-risk diagnosis indicator in the storage assessment dimension comprises one or more of following:

the remaining storage usage duration being less than or equal to a second number of days, the storage amount increment day-on-day ratio being greater than a second proportion, the proportion of small files being greater than a second ratio, or the proportion of disk bad blocks being greater than a second bad block proportion, wherein the second number of days is greater than the first number of days, the second proportion is less than the first proportion, the second ratio is less than the first ratio, and the second bad block proportion is less than the first bad block proportion; and the low-risk diagnosis indicator in the computation assessment dimension comprises one or more of following:

the queue blocking duration exceeding a second duration, a queue overflow duration exceeding a first overflow duration, the scheduling task failure rate being greater than a second failure rate, the scheduling task running duration being greater than a second running duration, a waiting-to-pass concurrent tasks ratio exceeding a third proportion, the queue usage computation time rate exceeding a second computation time rate, or a day-level task being completed across days, wherein the second duration is greater than the first duration, the second failure rate is less than the first failure rate, the second running duration is less than the first running duration, and the second computation time rate is less than the first computation time rate.

14. The electronic device according to claim 8, wherein the method further comprises:

obtaining a risk observation indicator in the storage assessment dimension and a risk observation indicator in the computation assessment dimension; and performing risk assessment on the data storage resource and the data computation resource based on the risk observation indicator in the storage assessment dimension and the risk observation indicator in the computation assessment dimension, wherein the risk observation indicator in the storage assessment dimension comprises one or more of following:

a small file ranking result, a remaining storage amount, an average storage increment in a time period, a number of remaining storage available days, a daily additional storage amount, or a total number of small files; and the risk observation indicator in the computation assessment dimension comprises one or more of following:

daily usage computation time, a daily usage computation time rate, a daily usage computation time day-on-day ratio, a scheduling task failure amount, a proportion of unfinished instances on a current day, a T+1 unfinished rate, a service level agreement task breach amount, a one-time success rate of task scheduling, a sum of task suspension durations in a cycle, or a number of queue tasks in the cycle.

15. A non-transitory computer-readable storage medium, storing a computer program, wherein the computer program, when executed by a processor, causes a method for assessing a risk caused by improper use of a cluster data resource to be implemented, wherein the method is applied to a scenario of resource allocation of a department, and the method comprises:

dividing, according to an impact degree of a risk caused by improper use of a data resource on a service, risk levels in a use process of the cluster data resource into three levels: a low-risk level, a high-risk level, and an accident level;

allocating the cluster data resource to the department;

obtaining an assessment dimension for assessing the risk of the cluster data resource, wherein the cluster data resource comprises a data storage resource and a data computation resource, and the assessment dimension comprises a storage assessment dimension and a computation assessment dimension;

obtaining at least one high-risk diagnosis indicator in the storage assessment dimension and at least one high-risk diagnosis indicator in the computation assessment dimension, wherein the high-risk diagnosis indicator in the storage assessment dimension, indicated for the storage assessment dimension, comprises an indicator for representing that a data resource usage amount of the data storage resource exceeds a first data storage resource threshold and/or an indicator for representing that the data storage resource does not comply with a first data storage resource usage rule, and the high-risk diagnosis indicator in the computation assessment dimension, indicated for the computation assessment dimension, comprises an indicator for representing that a data resource usage amount of the data computation resource exceeds a first data computation resource threshold;

counting a high-risk indicator trigger quantity in the storage assessment dimension and a high-risk indicator trigger quantity in the computation assessment dimension, wherein the high-risk indicator trigger quantity in the storage assessment dimension is an amount of high-risk diagnosis indicators in the storage assessment dimension that are satisfied in a use process of the data storage resource, and the high-risk indicator trigger quantity in the computation assessment dimension is an amount of high-risk diagnosis indicators in the computation assessment dimension that are satisfied in a use process of the data computation resource; and assessing a risk caused by improper use of the data storage resource based on the high-risk indicator trigger quantity in the storage assessment dimension, and assessing a risk caused by improper use of the data computation resource based on the high-risk indicator trigger quantity in the computation assessment dimension.

16. The non-transitory computer-readable storage medium according to claim 15, wherein counting the high-risk indicator trigger quantity in the storage assessment dimension and the high-risk indicator trigger quantity in the computation assessment dimension comprises:

determining indicator values corresponding to high-risk diagnosis indicators in the storage assessment dimension based on a usage situation of the data storage resource, and determining the high-risk indicator trigger quantity in the storage assessment dimension based on the indicator values corresponding to the high-risk diagnosis indicators in the storage assessment dimension; and determining indicator values corresponding to high-risk diagnosis indicators in the computation assessment dimension based on a usage situation of the data computation resource, and determining the high-risk indicator trigger quantity in the computation assessment dimension based on the indicator values corresponding to the high-risk diagnosis indicators in the computation assessment dimension.

17. The non-transitory computer-readable storage medium according to claim 16, wherein the high-risk diagnosis indicator in the storage assessment dimension comprises one or more of following:

a remaining storage usage duration being less than or equal to a first number of days, a storage amount increment day-on-day ratio being greater than a first proportion, a proportion of small files being greater than a first ratio, a proportion of disk bad blocks being greater than a first bad block proportion, a write forbidding trigger duration being greater than a third duration, a storage usage rate exceeding a first usage rate, or a set lifetime being less than a recommended value; and the high-risk diagnosis indicator in the computation assessment dimension comprises one or more of following:

a queue blocking duration exceeding a first duration, a scheduling task failure rate being greater than a first failure rate, a scheduling task running duration being greater than a first running duration, a queue usage computation time rate exceeding a first computation time rate, or a service level agreement task breach.

18. The non-transitory computer-readable storage medium according to claim 17, wherein the method further comprises:

obtaining at least one low-risk diagnosis indicator in the storage assessment dimension and at least one low-risk diagnosis indicator in the computation assessment dimension, wherein the low-risk diagnosis indicator in the storage assessment dimension comprises an indicator for representing that the data resource usage amount of the data storage resource exceeds a second data storage resource threshold and/or an indicator for representing that the data storage resource does not comply with a second data storage resource usage rule, the low-risk diagnosis indicator in the computation assessment dimension comprises an indicator for representing that the data resource usage amount of the data computation resource exceeds a second data computation resource threshold, the second data storage resource threshold is less than the first data storage resource threshold, and the second data computation resource threshold is less than the first data computation resource threshold;

obtaining a low-risk indicator trigger quantity in the storage assessment dimension and a low-risk indicator trigger quantity in the computation assessment dimension, wherein the low-risk indicator trigger quantity in the storage assessment dimension is an amount of low-risk diagnosis indicators in the storage assessment dimension that are satisfied in the use process of the data storage resource, and the low-risk indicator trigger quantity in the computation assessment dimension is an amount of low-risk diagnosis indicators in the computation assessment dimension that are satisfied in the use process of the data computation resource; and assessing the risk caused by improper use of the data storage resource based on the low-risk indicator trigger quantity in the storage assessment dimension, and assessing the risk caused by improper use of the data computation resource based on the low-risk indicator trigger quantity in the computation assessment dimension.

19. The non-transitory computer-readable storage medium according to claim 18, wherein obtaining the low-risk indicator trigger quantity in the storage assessment dimension and the low-risk indicator trigger quantity in the computation assessment dimension comprises:

determining indicator values corresponding to low-risk diagnosis indicators in the storage assessment dimension based on the usage situation of the data storage resource, and determining the low-risk indicator trigger quantity in the storage assessment dimension based on the indicator values corresponding to the low-risk diagnosis indicators in the storage assessment dimension; and determining indicator values corresponding to low-risk diagnosis indicators in the computation assessment dimension based on the usage situation of the data computation resource, and determining the low-risk indicator trigger quantity in the computation assessment dimension based on the indicator values corresponding to the low-risk diagnosis indicators in the computation assessment dimension.

20. The non-transitory computer-readable storage medium according to claim 19, wherein the low-risk diagnosis indicator in the storage assessment dimension comprises one or more of following:

the remaining storage usage duration being less than or equal to a second number of days, the storage amount increment day-on-day ratio being greater than a second proportion, the proportion of small files being greater than a second ratio, or the proportion of disk bad blocks being greater than a second bad block proportion, wherein the second number of days is greater than the first number of days, the second proportion is less than the first proportion, the second ratio is less than the first ratio, and the second bad block proportion is less than the first bad block proportion; and the low-risk diagnosis indicator in the computation assessment dimension comprises one or more of following:

the queue blocking duration exceeding a second duration, a queue overflow duration exceeding a first overflow duration, the scheduling task failure rate being greater than a second failure rate, the scheduling task running duration being greater than a second running duration, a waiting-to-pass concurrent tasks ratio exceeding a third proportion, the queue usage computation time rate exceeding a second computation time rate, or a day-level task being completed across days, wherein the second duration is greater than the first duration, the second failure rate is less than the first failure rate, the second running duration is less than the first running duration, and the second computation time rate is less than the first computation time rate.

* * * * *